(12) United States Patent
Bobier-Tiu et al.

(10) Patent No.: US 11,834,058 B2
(45) Date of Patent: Dec. 5, 2023

(54) SYSTEMS AND METHODS FOR CONTROLLING A VEHICLE BASED ON VEHICLE STATES AND CONSTRAINTS OF THE VEHICLE

(71) Applicant: TOYOTA RESEARCH INSTITUTE, INC., Los Altos, CA (US)

(72) Inventors: Carrie Bobier-Tiu, Sunnyvale, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 252 days.

(21) Appl. No.: 16/688,177

(22) Filed: Nov. 19, 2019

(65) Prior Publication Data

US 2020/0216085 A1 Jul. 9, 2020

Related U.S. Application Data

(60) Provisional application No. 62/788,711, filed on Jan. 4, 2019.

(51) Int. Cl.
*B60W 50/08* (2020.01)
*B60W 30/18* (2012.01)
(Continued)

(52) U.S. Cl.
CPC .......... *B60W 50/08* (2013.01); *B60W 30/18* (2013.01); *B60W 40/08* (2013.01); *B60W 50/0097* (2013.01); *B60W 2400/00* (2013.01)

(58) Field of Classification Search
CPC ...... B60W 50/08; B60W 30/18; B60W 40/08; B60W 50/0097; B60W 2400/00
See application file for complete search history.

(56) References Cited

U.S. PATENT DOCUMENTS 8,437,890 B2 5/2013 Anderson
8,457,827 B1 6/2013 Ferguson
(Continued)

FOREIGN PATENT DOCUMENTS

WO 2015024616 2/2015

*Primary Examiner* — Nicholas Kiswanto
*Assistant Examiner* — Jamal A Shah
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods of a vehicle for partially controlling operation of a vehicle based on operational constraints of the vehicle and/or contextual constraints of the vehicle are disclosed. Exemplary implementations may: generate output signals conveying operational information regarding the vehicle; generate output signals conveying contextual information regarding the vehicle; determine, based on the output signals, the operational information; determine, based on the output signals, the contextual information; determine, based on the operational information and/or the contextual information, a current vehicle state of the vehicle; determine, based on the current vehicle state of the vehicle, a future vehicle state; determine, based on the operational information, predicted boundaries of the operational information; determine, based on the operational information and contextual information, trajectory threshold values of trajectory metric; and control the vehicle partially, based on the future vehicle states determined, the predicted boundaries, and the trajectory threshold values.

20 Claims, 17 Drawing Sheets

(51) Int. Cl.
*B60W 50/00* (2006.01)
*B60W 40/08* (2012.01)

(56) References Cited

U.S. PATENT DOCUMENTS

| | | |
|---|---|---|
| 2010/0228427 A1 | 9/2010 | Anderson |
| 2014/0032017 A1* | 1/2014 | Anderson ................ G05D 1/00 |
| | | 701/3 |
| 2018/0164810 A1 | 6/2018 | Luo |
| 2019/0056731 A1* | 2/2019 | Westbrook ........... G05D 1/0214 |

* cited by examiner

SYSTEMS AND METHODS FOR CONTROLLING A VEHICLE BASED ON VEHICLE STATES AND CONSTRAINTS OF THE VEHICLE

PRIORITY CLAIM

This application claims the benefit of U.S. Provisional Application No. 62/788,711 filed Jan. 4, 2019, titled Systems And Methods for Partially Controlling a Vehicle Based on Vehicle States and Constraints of the Vehicle, and which is hereby incorporated herein by reference in its entirety.

TECHNICAL FIELD

The present disclosure relates to systems and methods of a vehicle for partially controlling operation of a vehicle. Some embodiments relate to partially controlling operation of the vehicle using operational constraints of the vehicle and/or contextual constraints.

BACKGROUND

Drivers may often be unaware of a vehicle's operational constraints or contextual constraints of an environment while driving. A driver may unmindfully make driving decisions that near or exceed the limits of the vehicle's operational constraints, which may result in a vehicle catastrophe of some sort. Furthermore, the driver may not have complete awareness of their contextual environment.

Brief Summary of Embodiments

According to various embodiments in the disclosed technology, a vehicle uses operational information and contextual information to determine a vehicle's operational constraints, contextual constraints, and current vehicle state given output signals of sensors within the vehicle. Future vehicle states may be predicted based on the current vehicle state. Based on the vehicle's operational constraints, contextual constraints, and future vehicle states predicted, the vehicle may control the vehicle such that a driver's operational input is corrected to avoid vehicle catastrophes.

One aspect of the present disclosure relates to a vehicle configured for partially controlling operation of a vehicle based on operational constraints of the vehicle and/or contextual constraints. The vehicle may include one or more hardware processors configured by machine-readable instructions or other circuits to perform the functions. Sensors may be configured to generate output signals conveying operational information regarding the vehicle. The sensors may include in-vehicle sensors or extra-vehicular sensors such as, for example, infrastructure sensors or sensors within other vehicles.

The operational information may include values of operational parameters of the vehicle. The sensors may be configured to generate output signals conveying contextual information. The processor(s) (or other circuitry) may be configured to determine, based on the output signals, the operational information. The processor(s) may be configured to determine, based on the output signals, the contextual information. The processor(s) may be configured to determine, based on the operational information and/or the contextual information, a current vehicle state of the vehicle. The current vehicle state may represent current values of the operational parameters of the vehicle and/or values of the contextual parameters of the vehicle. The processor(s) may be configured to determine, based on the current vehicle state, a future vehicle state of the vehicle. The processor(s) may be configured to determine, based on the operational information, predicted boundaries of the operational information. A breach of the predicted boundaries may indicate undesirable values of the operational parameters of the vehicle such that the values are nearing the operational constraints of the vehicle. The processor(s) may be configured to determine, based on the operational information and contextual information, predicted threshold values of a trajectory metric. The predicted threshold values of the trajectory metric may represent desirable circumventions in order to avoid causing vehicle catastrophes. The processor(s) may be configured to control the vehicle. Controlling the vehicle may be based on the future vehicle state determined, the predicted boundaries of the operational information, and the predicted trajectory threshold values. The processor(s) may be configured to control the vehicle partially such that effectuation of a determined corrective response may be in coordination with the driver's control of the vehicle. The driver may maintain a majority of control of the vehicle during such control of the vehicle.

As used herein, the term "determine" (and derivatives thereof) may include measure, calculate, compute, estimate, approximate, generate, and/or otherwise derive, and/or any combination thereof.

One aspect of the present disclosure relates to a method for partially controlling operation of a vehicle based on operational constraints of the vehicle and/or contextual constraints of the vehicle. The method may include generating output signals conveying operational information regarding the vehicle. The operational information may include values of operational parameters of the vehicle. The method may include generating output signals conveying contextual information. The contextual information may include values of contextual parameters of the vehicle. The method may include determining, based on the output signals, the operational information. The method may include determining, based on the output signals, the contextual information. The method may include determining, based on the operational information and/or the contextual information, a current vehicle state of the vehicle. The current vehicle state may represent current values of the operational parameters of the vehicle and/or values of the contextual parameters of the vehicle. The method may include determining, based on the current vehicle state, a future vehicle state of the vehicle. The method may include determining, based on the operational information, predicted boundaries of the operational information. A breach of the predicted boundaries may indicate undesirable values of the operational parameters of the vehicle such that the values are nearing the operational constraints of the vehicle. The method may include determining, based on the operational information and contextual information, predicted threshold values of a trajectory metric. The predicted threshold values of the trajectory metric may represent desirable circumventions in order to avoid causing vehicle catastrophes. The method may include controlling the vehicle. Controlling the vehicle may be based on the future vehicle state determined, the predicted boundaries of the operational information determined, and the predicted trajectory threshold values determined. The method may include controlling the vehicle partially such that effectuation of a determined corrective response may be in coordination with the driver's control of the vehicle. The driver may maintain a majority of control of the vehicle during such control of the vehicle.

Embodiments relate to blending driver input controls with system-generated controls from a semi-autonomous driving system. As a driver approaches any envelope limitation in N-Dimensional space, the blending with the systems commands may increase, until at the envelope limits, the system may be in full or majority control.

In general, the system may use many different inputs to measure a current state of the vehicle. For example, the system may consider the driver inputs (i.e., steering angle, accelerator/braking inputs), vehicle information (sideslip, yaw rate, roll rate, tire stiffness, vehicle mass, etc.), environmental conditions/context (road friction, distance to safe road bounds (laterally—environmental envelope), heading error to the desired path, center of safe road bounds, road edge, distance to predetermined yaw rate and sideslip (or lateral velocity) bounds—vehicle state envelope), and further factors such as actuator limits (i.e., steer angle limits or steer rate limits), command delay, and so on.

Using the current measurements, the system may predict various future states at a time horizon (e.g., 5 seconds). The predictions may include aspects such as what the driver is likely to do, which path the vehicle is most likely to take down the road, which objects are present and their movements, and vehicle states given the prior predictions (i.e., changes in yaw rate, sideslip etc.). The predictions can be generated at varying levels of granularity (e.g., varying time steps) and time horizons with, for example, variable/less granularity at long horizons. The prediction may take several different forms including holding current commands constant, blending commands according to a prior optimal solution, predicting commands according to a machine learning approach, and so on with incentive provided to tracking the current driver input.

The system may further define boundaries (e.g., an envelope) at each time step that include the vehicle is to operate within. The boundaries may include physical bounds such as road boundaries, obstacles, etc. The boundaries can further include vehicle state boundaries indicating maximum conditions for aspects such as max yaw rate, actuator limits (i.e., max steering angle, acceleration, etc.).

Some or all of the noted predictions and boundaries may be fed into a control circuit that is formulated as an optimization problem. In particular, the control circuit may be implemented using model predictive control (MPC). The control circuit may provide a series of blended controls over each time step out to the time horizon. The System may then apply the first blended control in the series to the vehicle. The blended control may result in the driver input being passed through to vehicle actuators with little or no modification, or the system generated inputs are used to modify the driver inputs in varying degrees to provide desired control. Thereafter, the system may iterate over the same calculations for a next time step.

Accordingly, in some implementations, the blending may occur for an individual time step and for subsequent time steps until a control input provided by the driver is within an acceptable range. Thus, the system does not take control from the driver as an absolute once the envelope is violated but instead provides correcting actions so long as the driver inputs remain inadequate.

A process for vehicle control may include: receive first signals from a plurality of vehicle sensors, the signals comprising operational information regarding the vehicle; receive second signals comprising contextual information regarding the vehicle; determine an envelope for the vehicle in a defined time horizon based on vehicle parameters; predict a driver intent for the defined time horizon based on the operational information and contextual information; develop a vehicle control solution to operate the vehicle within the determined envelope in the defined time horizon; and apply the determined control solution to the vehicle.

Determining an envelope may include determining contextual constraints using the contextual information and defining the envelope to account for contextual constraints in addition to vehicle parameters. The contextual constraints may shrink at least one dimension of the envelope. Assessing a risk associated with the predicted driver intent may include predicting a dynamic problem for the vehicle over the defined time horizon based on driver intent.

The process may further include dividing the control operation into a series of discrete time steps wherein the defined time horizon may include a discrete time step, and dividing the operation into a series of discrete time steps may include variable time discretization to account for short-term and long-term objectives.

The contextual constraints may be used to further define the envelope for the vehicle, and the refined envelope is used to develop the vehicle control solution such that no threat assessment is performed after the vehicle control solution is determined.

The operation of applying the determined control solution to the vehicle may include generating an input sequence with an amount of modification to a driver's commands determined based on envelope proximity.

Developing a vehicle control solution may include evaluating a vehicle envelope, and actuator envelope and vehicle models.

In further embodiments, a process for vehicle control may include: receive first signals from a plurality of vehicle sensors, the signals comprising operational information regarding the vehicle; receive second signals comprising contextual information regarding the vehicle; determine an envelope for the vehicle in a defined time horizon; determine, based on the operational information and contextual information a current vehicle state of the vehicle and predict a future vehicle state of the vehicle; determine, based on the operational information and contextual information, trajectory threshold values of a trajectory metric; and control the vehicle partially, based on the future vehicle states determined, the envelope, and the trajectory threshold values.

In other embodiments, a vehicle control system may include: a processor; and a memory coupled to the processor to store instructions, which when executed by the processor, cause the processor to perform operations. The operations may include: determine an envelope for the vehicle in a defined time horizon based on vehicle parameters; predict a driver intent for the defined time horizon based on operational information and contextual information about the vehicle; develop a vehicle control solution to operate the vehicle within the determined envelope in the defined time horizon; and apply the determined control solution to the vehicle.

Determining an envelope may include determining contextual constraints using the contextual information and defining the envelope to account for contextual constraints in addition to vehicle parameters. The contextual constraints may shrink at least one dimension of the envelope. The risk associated with the predicted driver intent may include predicting a dynamic problem for the vehicle over the defined time horizon based on driver intent.

The system may divide the control operation into a series of discrete time steps wherein the defined time horizon may include a discrete time step. Dividing the operation into a series of discrete time steps may include variable time discretization to account for short-term and long-term objectives.

The contextual constraints may be used to further define the envelope for the vehicle, and the refined envelope is used to develop the vehicle control solution such that no threat assessment is performed after the vehicle control solution is determined.

Applying the determined control solution to the vehicle may include generating an input sequence with an amount of modification to a driver's commands determined based on envelope proximity.

Developing a vehicle control solution may include evaluating a vehicle envelope, and actuator envelope and vehicle models.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

Figure 1:
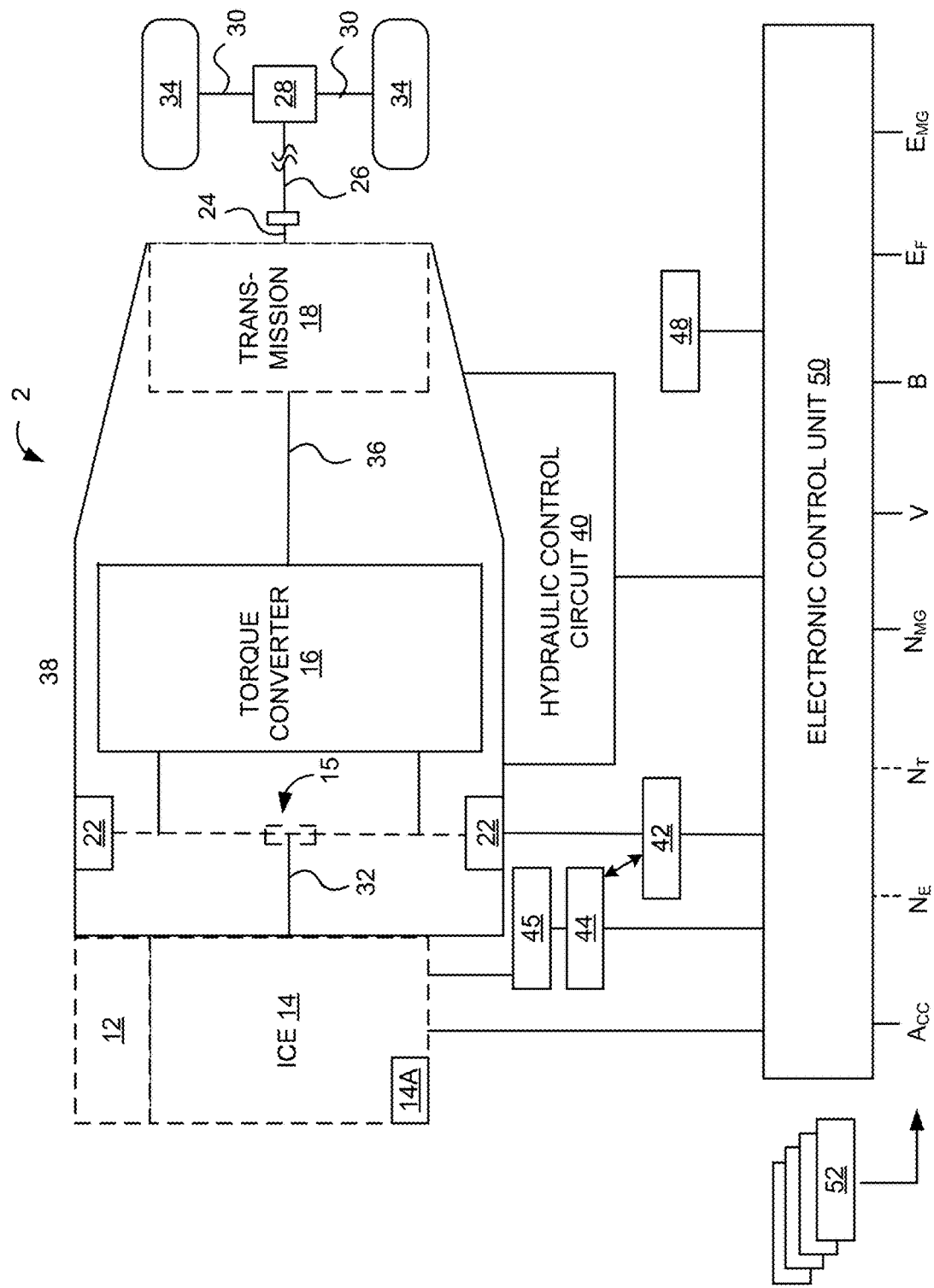
FIG. 1 illustrates an example vehicle with which embodiments of the disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the systems and methods disclosed herein relate to blending driver input controls with system-generated vehicle controls from a semi-autonomous driving system. The system evaluates performance envelopes and as a driver approaches any envelope limitation in N-Dimensional space, the blending with system generated vehicle commands will increase, until at the envelope limits, the system has taken over full or majority control.

Embodiments may be configured to use multiple inputs (e.g., from sensors) to measure a current state of the vehicle. For example, the system considers driver inputs (e.g., steering angle, accelerator/braking inputs), vehicle information (e.g., sideslip, yaw rate, roll rate, tire stiffness, vehicle mass, etc.), environmental conditions or context (e.g., road friction), distance to safe road bounds (e.g., laterally—environmental envelope), heading error to the desired path, center of safe road bounds, road edge, distance to predetermined yaw rate and sideslip (or lateral velocity bounds—vehicle state envelope), and further factors such as actuator limits (i.e., steer angle limits or steer rate limits), command delay, and so on.

The system may use some or all of these measurements to predict various future states at a determined time horizon (e.g., 5 seconds). The predictions may include aspects such as what the driver is likely to do, which path the vehicle is most likely to take down the road, which objects are present and their movements, and vehicle states given the prior predictions (e.g., changes in yaw rate, sideslip etc.). The predictions can be generated at varying levels of granularity (e.g., varying time steps) and time horizons with, for example, variable granularity at different horizons (e.g., less granularity at longer horizons). The prediction may take several different forms including holding current commands constant, blending commands according to a prior optimal solution, predicting commands according to a machine learning approach, and so on, with incentive provided to tracking the current driver input.

Embodiments may be implemented to further define boundaries (such as by an envelope) at each time step that include parameters within which the vehicle is to operate. The boundaries may include physical bounds such as road boundaries, obstacles, etc. The boundaries can further include vehicle state boundaries indicating maximum conditions for aspects such as max yaw rate, actuator limits (e.g., max steering angle, acceleration, etc.).

The noted predictions and boundaries may be fed into a control algorithm that is formulated as an optimization problem. In various embodiments, the control algorithm may be implemented using model predictive control (MPC). MPC can be used to predict future dynamic problems forward in time over a time horizon and a solution can be implemented and calculated to avoid the predicted problem. Embodiments may be implemented in which the controller has at least two main objectives. These include a short-term objective of restricting fast dynamics related to vehicle stability and tracking driver commands, and a longer-term objective of keeping the vehicle within a safe path on the road. Accordingly, embodiments may be implemented to use a variable time discretization for the MPC horizon to account for short-term and longer-term objectives. The controller (MPC problem) may use models such as a planar lateral bicycle model with weight transfer, a lateral brush tire model, and path coordinate positional dynamics. More complex models may be used in other embodiments.

The control algorithm may be configured to provide a series of blended controls over each time step out to the time horizon. The System may then apply the first blended control in the series to the vehicle. The blended control may indicate that the driver input is to be passed through or that system generated inputs are to be combined with the driver inputs in varying degrees. Thereafter, the system may iterate over the same calculations for a next time step.

Accordingly, the blending may occur for an individual time step and for subsequent time steps until a control input provided by the driver is within an acceptable range. Thus, the system does not necessarily take control from the driver as an absolute once the envelope is violated but instead provides correcting actions so long as the driver inputs remain inadequate.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for vehicle control can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, Nv. These may also include torque converter 16 output, NT (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
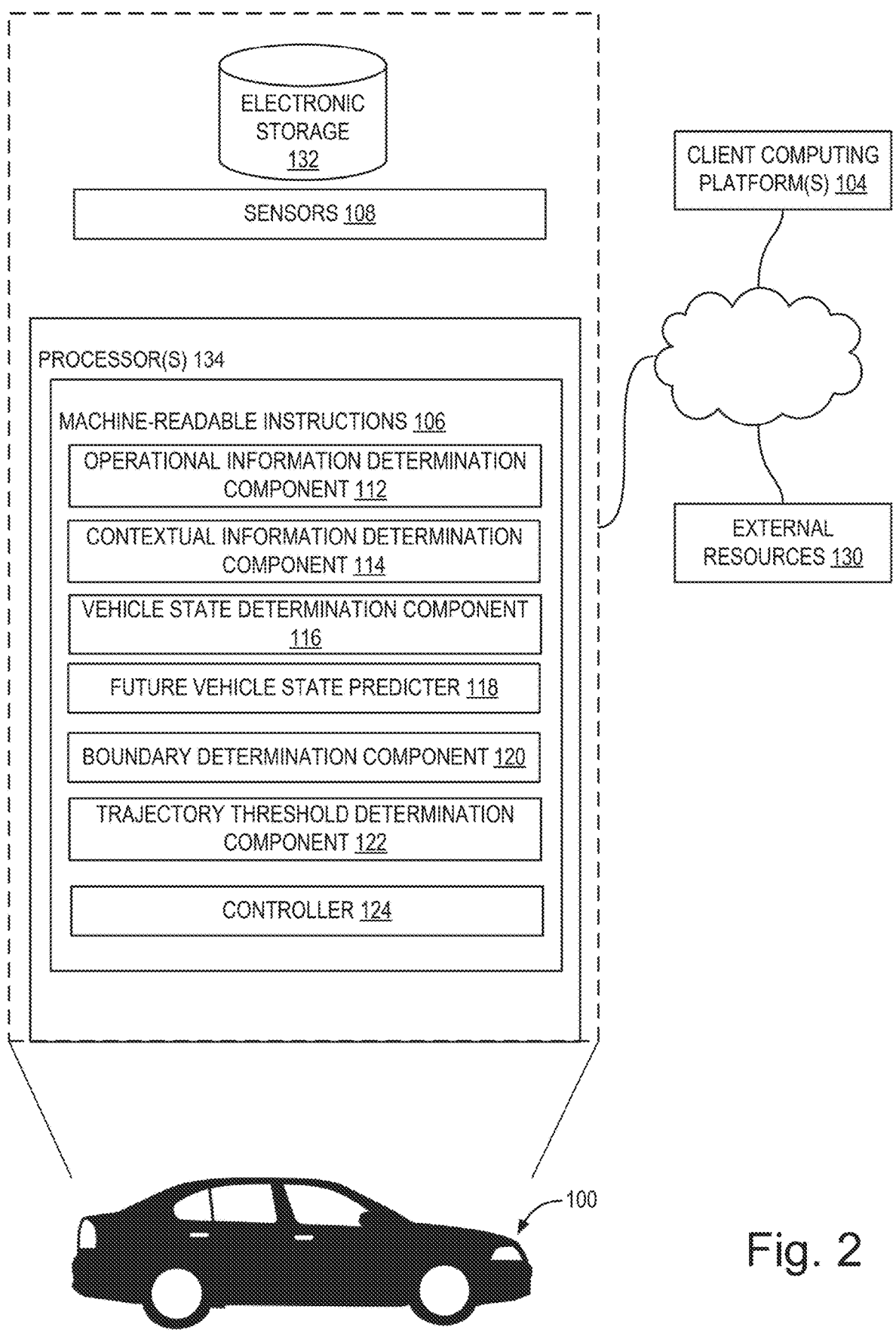
FIG. 2 illustrates an example vehicle configured for partially controlling operation of a vehicle based on operational constraints of the vehicle and/or contextual constraints of the vehicle, in accordance with one or more implementations.

FIG. 2 illustrates a vehicle 100 (e.g., vehicle 2) configured for partially controlling operation of a vehicle based on operational constraints of the vehicle and/or contextual constraints of a vehicle, in accordance with one or more implementations. In some implementations, vehicle 100 may include sensors 108, electronic storage 132, processor(s) 134, and/or other components. Vehicle 100 may be configured to communicate with one or more client computing platforms 104 according to a client/server architecture and/or other architectures. In some implementations, users may access vehicle 100 via client computing platform(s) 104.

Sensors 108 may be configured to generate output signals conveying operational information regarding the vehicle. The operational information may include values of operational parameters of the vehicle. The operational parameters of vehicle 100 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 100 tires and roadway, distance from center of gravity of vehicle 100 to front axle, distance from center of gravity of vehicle 100 to rear axle, total mass of vehicle 100, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 100. In some implementations, at least one of sensors 108 may be a vehicle system sensor included in an engine control module (ECM) system or an electronic control module (ECM) system of vehicle 100. In some implementations, at least one of sensors 108 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 108 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100. In some implementations, sensors may also include sensors within nearby vehicles (e.g. communicating with the subject vehicle via V to V or other communication interface) and or infrastructure sensors (e.g. communicating with the subject vehicle via the 2 1 or other communication interface).

Sensors 108 may be configured to generate output signals conveying contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.), etc.), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far left lane of a four lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 108 may include virtual sensors, imaging sensors, depth sensors, cameras, and/or other sensors. As used herein, the term "camera", "sensor" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 132, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 100 may be configured by machine-readable instructions 106. Machine-readable instructions 106 may include one or more instruction components. The instruction components may include computer program components. The instruction components may include one or more of operational information determination component 112, contextual information determination component 114, a vehicle state determination component 116, a future vehicle state predictor 118, a boundary determination component 120, a trajectory threshold determination component 122, a controller 124, and/or other instruction components.

Operational information determination component 112 may be configured to determine the operational information. The operational information may be based on the output signals. Determination may include identifying the yaw rate, sideslip, slip angle, heading, and/or other operational information of vehicle 100 such that the values of all or some of the operational parameters are identified; identifying if operational parameter values have normal or abnormal quantities; identifying if operational parameter values have near abnormal quantities, identifying extreme excess or extreme deficiency of operational parameter values.

Contextual information determination component 114 may be configured to determine the contextual information. The contextual information may characterize the surrounding contextual environment of the vehicle. Determination of the contextual information may be based on the output signals. Determination of the contextual information may include identifying obstacles, identifying motion of obstacles, estimating distances between vehicle 100 and other vehicles, identifying lane markings, identifying traffic lane markings, identifying traffic signs and signals, identifying crosswalk indicators, identifying upcoming curvature of the roadway, and/or other determinations. Determination of the contextual information may include identify ambient conditions such as temperature, rain, snow, hail, fog, and/or other ambient conditions that may affect control of vehicle 100.

By way of example, contextual information characterizing the contextual environment of vehicle 100 may include values of contextual parameters including direction of travel is North, roadway is three lanes, no roadway shoulder, guardrails constrain the roadway, vehicle 100 is in middle lane, there is secondary vehicle ahead of vehicle 100 in the lane to the left at a given distance. Determined predicted threshold values of the trajectory metric may include considering the guardrails of the roadway, the secondary vehicle nearby, and/or the lane boundaries of the roadway.

In some implementations, contextual information determined by contextual information determination component 114 may be stored in electronic storage 132. In some implementations, the contextual information may be store temporarily such as until a drive is over, until the end of the day, until the end of the week, until the end of the month, until the end of the year, or until it is manually cleared.

Vehicle state determination component 116 may be configured to determine a current vehicle state of the vehicle. The determination of the current vehicle state may be based on the operational information and/or the contextual information. The current vehicle state may represent a current set of values of a set of operational parameters of the vehicle. The current vehicle state may be indicative of the vehicle's stability at a point in time. The current vehicle state may represent a current set of values of a set of contextual parameters. The current vehicle state may be indicative of the vehicle's surrounding environment at a point in time.

In some implementations, the current vehicle state determined by vehicle state determination component 116 may be stored in electronic storage 132 and considered a prior vehicle state. In some implementations, the current vehicle state may be stored temporarily such as until a drive is over, until the end of the day, until the end of the week, until the end of the month, until the end of the year, or until it is manually cleared.

Future vehicle state predictor 118 may be configured to determine a future vehicle state of the vehicle. The future vehicle state of the vehicle may be based on the current vehicle state determined. The future vehicle state may include what a driver of the vehicle is likely to do, a position on the roadway likely to be travelled towards, obstacles on the roadway and their movements, prior vehicle states determined, and/or others. Determination may occur at different levels of granularity. Determination may occur at varying time horizons. In some implementations, more than one future vehicle state may be determined at varying time horizons.

Boundary determination component 120 may be configured to determine predicted boundaries of the operational information. Determination may be based on the operational information. A breach of the predicted boundaries may indicate undesirable values of the operational parameters of the vehicle such that the values are nearing the operational constraints of the vehicle. A breach of the predicted boundaries may include exceeding one or more values of the operational parameters or calculated values based on values of the operational parameters. Nearing and/or exceeding the operational constraints of the vehicle may cause the vehicle and/or a driver of the vehicle to lose vehicle stability, lose vehicle control, cause a collision, and/or other vehicle catastrophes.

Trajectory threshold determination component 122 may be configured to determine predicted threshold values of a trajectory metric. Determination may be based on the contextual information and the operational information. The trajectory metric may characterize a trajectory of the vehicle such that the vehicle is traveling on a roadway. The predicted threshold values of the trajectory metric may represent desirable circumventions in order to avoid causing vehicle catastrophes. Vehicle catastrophes may include a collision, losing control of the vehicle, losing vehicle stability, veering into other lanes, and/or other vehicle catastrophes. By way of non-limiting example, the predicted thresholds of the trajectory metric account for obstacles in the roadway, lane boundaries, roadway boundaries, vehicle width, and/or other predicted thresholds of the trajectory metric. Roadway boundaries may include guardrails, center medians, specific lane markings, parked vehicles, pedestrians, curbs, sidewalks, opposing direction of travel, concrete barriers, barriers of other materials, traffic cones, and/or other roadway boundaries. Vehicle width may be accounted for when determining the predicted threshold values such that obstacles and/or boundaries may be laterally closer in proximity to a wider vehicle.

Controller 124 may be configured to control the vehicle such that the vehicle may circumvent vehicle catastrophes. Controlling the vehicle may be based on the future vehicle state determined, the predicted boundaries of the operational information, and the predicted trajectory threshold values. Controller 124 may be configured to control the vehicle partially. Implementations where controller 124 controls the vehicle partially includes effectuating a determined corrective response in coordination with the driver's operational input such that the driver maintains a majority of the control of the vehicle and controller 124 guides some operational aspects of the vehicle. The corrective response may include modifying some values of the operational parameters and it may be determined by controller 124.

By way of non-limiting example, vehicle 100 may be operated by a driver transporting to a destination. Controller 124 may utilize the future vehicle state determined, the predicted boundaries of the operational information, and the predicted trajectory threshold values to correct the driver's driving decisions and decrease vehicle speed and degree of steer upon determination that, for example, vehicle 100 was traveling too fast on a round onramp to a highway such that vehicle 100 may rollover.

In some implementations, vehicle 100, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which vehicle 100, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with vehicle 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of vehicle 100, external entities participating with vehicle 100, and/or other resources. In some implementations, some or all of the functionality attributed herein to external resources 130 may be provided by resources included in vehicle 100.

Vehicle 100 may include electronic storage 132, one or more processors 134, and/or other components. Vehicle 100 may include communication lines, or ports to enable the exchange of information with a network and/or other computing platforms. Illustration of vehicle 100 in FIG. 1 is not intended to be limiting. Vehicle 100 may include a plurality of hardware, software, and/or firmware components operating together to provide the functionality attributed herein to vehicle 100. For example, vehicle 100 may be implemented by a cloud of computing platforms operating together as vehicle 100.

Electronic storage 132 may comprise non-transitory storage media that electronically stores information. The electronic storage media of electronic storage 132 may include one or both of system storage that is provided integrally (i.e., substantially non-removable) with vehicle 100 and/or removable storage that is removably connectable to vehicle 100 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from vehicle 100, information received from client computing platform(s) 104, and/or other information that enables vehicle 100 to function as described herein.

Processor(s) 134 may be configured to provide information processing capabilities in vehicle 100. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 2 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 112, 114, 116, 118, 120, 122, and/or 124, and/or other components. Processor(s) 134 may be configured to execute components 112, 114, 116, 118, 120, 122, and/or 124, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 112, 114, 116, 118, 120, 122, and/or 124 are illustrated in FIG. 1 as being implemented within a single processing unit, in implementations in which processor(s) 134 includes multiple processing units, one or more of components 112, 114, 116, 118, 120, 122, and/or 124 may be implemented remotely from the other components. The description of the functionality provided by the different components 112, 114, 116, 118, 120, 122, and/or 124 described below is for illustrative purposes, and is not intended to be limiting, as any of components 112, 114, 116, 118, 120, 122, and/or 124 may provide more or less functionality than is described. For example, one or more of components 112, 114, 116, 118, 120, 122, and/or 124 may be eliminated, and some or all of its functionality may be provided by other ones of components 112, 114, 116, 118, 120, 122, and/or 124. As another example, processor(s) 134 may be configured to execute one or more additional components that may perform some or all of the functionality attributed below to one of components 112, 114, 116, 118, 120, 122, and/or 124.

Figure 3:
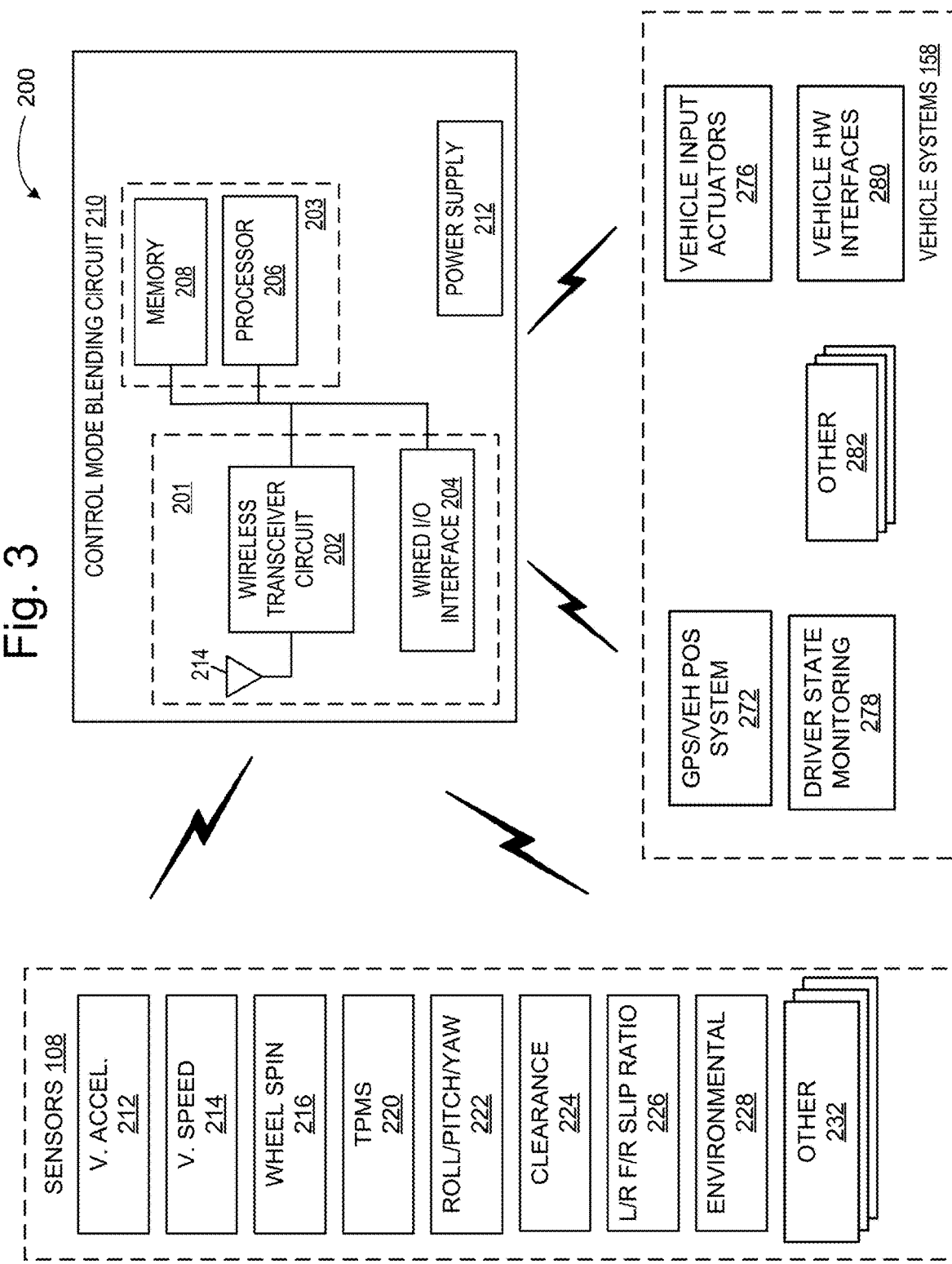
FIG. 3 illustrates an example architecture for predicting envelope violation and implementing a control mode in accordance with one embodiment of the systems and methods described herein.

FIG. 3 illustrates an example architecture for predicting envelope violation and implementing a control mode in accordance with one embodiment of the systems and methods described herein. Referring now to FIG. 3, in this example, control mode system 200 includes a control mode blending circuit 210, a plurality of sensors 108 and a plurality of vehicle systems 158. Sensors 108 and vehicle systems 158 can communicate with control mode blending circuit 210 via a wired or wireless communication interface. Although sensors 108 and vehicle systems 158 are depicted as communicating with control mode blending circuit 210, they can also communicate with each other as well as with other vehicle systems. Control mode blending circuit 210 can be implemented as an ECU or as part of an ECU such as, for example electronic control unit 50. In other embodiments, control mode blending circuit 210 can be implemented independently of the ECU.

Control mode blending circuit 210 in this example includes a communication circuit 201, a decision circuit 203 (including a processor 206 and memory 208 in this example) and a power supply 212. Components of control mode blending circuit 210 are illustrated as communicating with each other via a data bus, although other communication in interfaces can be included.

Processor 206 (e.g., processor 134) can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to control mode blending circuit 210.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a control mode blending circuit 210.

Communication circuit 201 either or both a wireless transceiver circuit 202 with an associated antenna 214 and a wired I/O interface 204 with an associated hardwired data port (not illustrated). As this example illustrates, communications with control mode blending circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by control mode blending circuit 210 to/from other entities such as sensors 108 and vehicle systems 158.

Wired I/O interface 204 can include a transmitter and a receiver (not shown) for hardwired communications with other devices. For example, wired I/O interface 204 can provide a hardwired interface to other components, including sensors 108 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 108 can include, for example, one or more of sensors 52 such as those described above with reference to the example of FIG. 1 and sensors 108 described above with reference to FIG. 2. Sensors 108 can include sensors that may or not otherwise be included on a standard vehicle 10 with which embodiments of the present disclosure are implemented. In the example illustrated in FIG. 3, sensors 108 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect weather, traction conditions, or other environmental conditions). Additional sensors 232 can also be included as may be appropriate for a given implementation of assist-mode system 200.

Vehicle systems 158 can include any of a number of different vehicle components or subsystems used to control or monitor various aspects of the vehicle and its performance. In this example, the vehicle systems 158 include a GPS or other vehicle positioning system 272; driver-state monitoring system 278 to monitor a condition of the driver; vehicle input actuators 276 vehicle hardware interface 282 provide inputs to vehicle systems for vehicle control; and other vehicle systems 282.

During operation, control mode blending circuit 210 can receive information from various vehicle sensors to determine whether the control mode should be activated. Communication circuit 201 can be used to transmit and receive information between control mode blending circuit 210 and sensors 108, and control mode blending circuit 210 and vehicle systems 158. Also, sensors 108 may communicate with vehicle systems 158 directly or indirectly (e.g., via communication circuit 201 or otherwise).

In various embodiments, communication circuit 201 can be configured to receive data and other information from sensors 108 that is used in determining whether and to what extent control mode blending should be activated. Additionally, communication circuit 201 can be used to send an activation signal or other activation information to various vehicle systems 158 as part of entering the control mode. For example, as described in more detail below, communication circuit 201 can be used to send signals to one or more of the vehicle input actuators 276 to control things such as, for example, maximum steering angle, throttle response, vehicle braking, torque vectoring, and so on.

Figure 4:
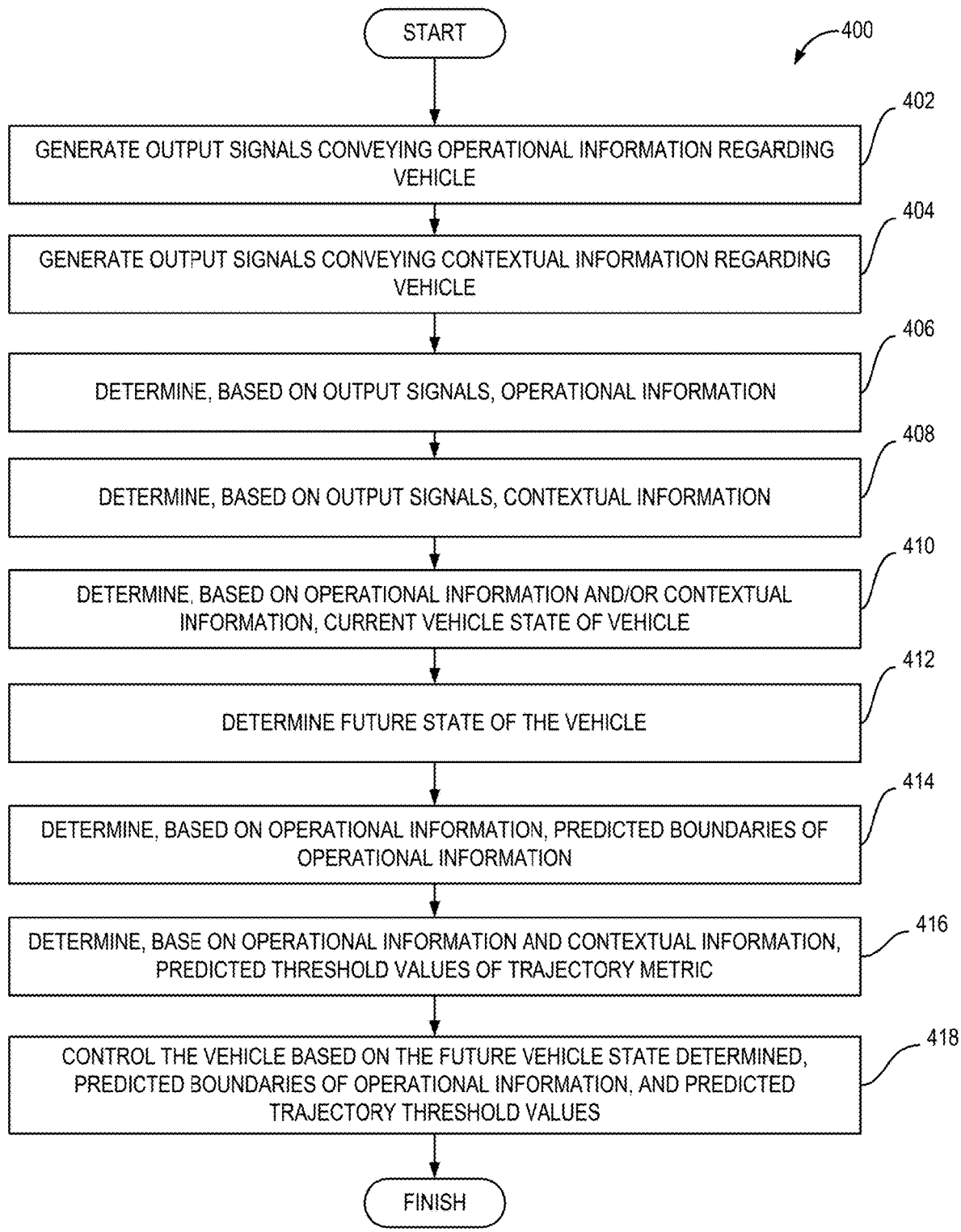
FIG. 4 illustrates an example process for partially controlling operation of a vehicle based on operational constraints of the vehicle and/or contextual constraints of the vehicle, in accordance with one or more implementations.

FIG. 4 illustrates an example process for partially controlling operation of a vehicle based on operational constraints of the vehicle or contextual constraints, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include generating output signals conveying operational information regarding the vehicle. The operational information may include values of operational parameters of the vehicle. Operation 402 may be performed by one or more hardware processors configured by machine-readable instructions including a component that is the same as or similar to sensors 108, in accordance with one or more implementations.

An operation 404 may include generating output signals conveying contextual information regarding the vehicle. The contextual information may include values of contextual parameters of the vehicle. Operation 404 may be performed by one or more hardware processors configured by machine-readable instructions including a component that is the same as or similar to sensors 108, in accordance with one or more implementations.

An operation 406 may include determining the operational information. The determination of the operational information may be based on the output signals. Operation 406 may be performed by one or more hardware processors configured by machine-readable instructions including a component that is the same as or similar to operational information determination component 112, in accordance with one or more implementations.

An operation 408 may include determining the contextual information. The determination of the contextual information may be based on the output signals. Operation 408 may be performed by one or more hardware processors configured by machine-readable instructions including a component that is the same as or similar to contextual information determination component 114, in accordance with one or more implementations.

An operation 410 may include determining a current vehicle state of the vehicle. The determination of the current vehicle state may be based on the operational information and/or contextual information. The current vehicle state may represent current values of the operational parameters of the vehicle. The current vehicle state may represent current values of the contextual parameters of the vehicle. Operation 410 may be performed by one or more hardware processors configured by machine-readable instructions including a component that is the same as or similar to vehicle state determination component 116, in accordance with one or more implementations.

An operation 412 may include determining a future vehicle state of the vehicle. The determination of the current vehicle state may be based on the current vehicle state. Operation 412 may be performed by one or more hardware processors configured by machine-readable instructions including a component that is the same as or similar to future vehicle state predictor 118, in accordance with one or more implementations.

An operation 414 may include determining predicted boundaries of the operational information. A breach of the predicted boundaries may indicate undesirable values of the operational parameters of the vehicle such that the values are nearing the operational constraints of the vehicle. Operation 414 may be performed by one or more hardware processors configured by machine-readable instructions including a component that is the same as or similar to boundary determination component 140, in accordance with one or more implementations.

An operation 416 may include determining predicted threshold values of a trajectory metric. Determination may be based on the contextual information and the operational information. Operation 416 may be performed by one or more hardware processors configured by machine-readable instructions including a component that is the same as or similar to trajectory threshold determination component 122, in accordance with one or more implementations.

An operation 418 may include controlling the vehicle such that the vehicle may circumvent vehicle catastrophes. Controlling the vehicle may be based on the future vehicle state determined, the predicted boundaries of the operational information, and the predicted trajectory threshold values. Operation 418 may be performed by one or more hardware processors configured by machine-readable instructions including a component that is the same as or similar to controller 124, in accordance with one or more implementations.

Figure 5:
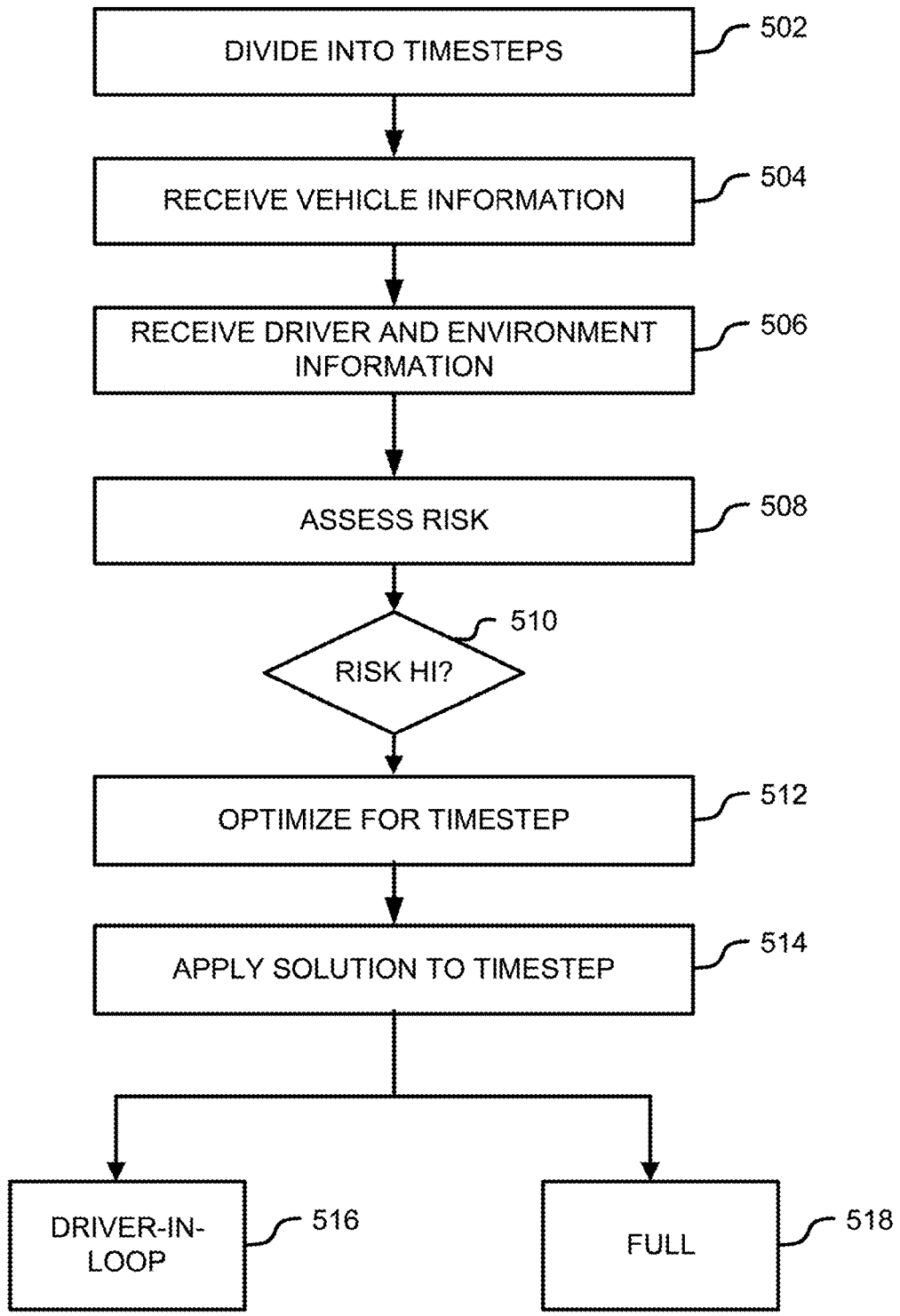
FIG. 5 illustrates another example process for partially controlling operation of a vehicle based on operational constraints of the vehicle or contextual constraints, in accordance with one or more implementations.

FIG. 5 illustrates another example process for partially controlling operation of a vehicle based on operational constraints of the vehicle or contextual constraints, in accordance with one or more implementations. More particularly, FIG. 5 provides another way of looking at the process described above with reference to FIG. 4. In some implementations, this process may be accomplished with one or more additional operations not described, and/or without one or more of the operations discussed. Additionally, the order in which the operations of this method are illustrated in FIG. 5 and described below is not intended to be limiting.

At operation 502 the controller divides the control operation (e.g., the operations of FIG. 4) into a series of discrete time steps. As noted above, model predictive control (MPC) can be used to predict future dynamic problems forward in time over a time horizon and a solution can be implemented and calculated to avoid the predicted problem. Embodiments may be implemented in which the controller has at least two main objectives.

These include a short-term objective of restricting fast dynamics related to vehicle stability and tracking driver commands, and a longer-term objective of keeping the vehicle within a safe path on the road. Accordingly, embodiments may be implemented to use a variable time discretization for the MPC horizon to account for short-term and longer-term objectives. When discretizing a continuous vehicle model, the time step $t_s$ need not be constant, but may vary depending on the depth of the horizon.

For the kth step in the prediction horizon, the variable timestep may be defined as follows:

$$t_s(k) = \begin{cases} t_{short}(s), & 1 < k < T_{corr} \\ t_{corr}, & k = T_{corr} \\ t_{long}(s), & T_{corr} < k < (T) \end{cases}$$

where T is the length of the time horizon (in steps) and $t_{corr}$ is a correction time step at horizon step $T_{corr}$ that aligns the physical representation of the environment in a consistent manner from cycle to cycle (i.e. so the values of s at the long time steps are preserved in subsequent horizons and static obstacles don't look like they're moving). The correction time step works correctly when speed is assumed constant, so another solution may be required to account for speed changes (in K) occurring over the time horizon. Also note that $t_{short}$ and t/o,,9 should be multiples of each other for consistency in computation.

Discretization of the vehicle model may be implemented as a combination of zero-order hold for short time steps, and first-order hold for long time steps. Embodiments may be implemented such that throughout the short time steps, the input (e.g., lateral force, steer angle or other input) is held constant over the duration of the time steps. In many applications, this may be consistent with what is physically happening in low-level hardware controllers.

At operations 504 and 506, the control system (e.g., control mode blending circuit 210) receives vehicle, driver and other information from sources such as vehicle sensors (e.g., sensors 108) and vehicle systems (e.g., vehicle systems 158). Information may be received from other sources as well. For example, this can include information generated as described above with reference to operations 402 and 404 of FIG. 4.

Information may be received from external sensors such as sensors at infrastructure elements sensing the vehicle as it nears or passes such elements. Vehicle information can include, for example, information from vehicle sensors indicating vehicle operating parameters such as acceleration, speed, lateral acceleration, wheel traction, vehicle roll/pitch/yaw, and so on. Vehicle information can also include information from vehicle hardware inputs (e.g., from vehicle input actuators 276 and vehicle hardware interfaces 280). This can include information regarding vehicle parameters such, for example, as steering angle inputs, throttle inputs, brake inputs, current vehicle gear, and so on. This information can be used to determine, for example, how hard a vehicle is being driven or how much it is being pushed to its limits.

The system can receive information about the road on which the vehicle is traveling. For example, map and route information such as from a GPS or other vehicle positioning system (e.g., GPS/vehicle positioning system 272) can provide information such as the route on which the vehicle is traveling and whether the vehicle is about to encounter any curves, and if so, how sharp those curves may be. Vehicle sensors or external data can be used to determine road conditions such as, for example, terrain (e.g., rough, smooth, rocky, etc.), road surface type (e.g., paper, gravel, dirt, etc.). Environmental sensors or external data can be used to determine weather conditions for the current vehicle location. This information can be used to determine envelope conditions the vehicle is encountering or is about to encounter in a given time step of interest. For example, a subject vehicle will have certain limits negotiating a curve of a given radius on a paved roadway. In other words, there is a maximum speed beyond which the vehicle will not be able to safely negotiate the corner given expected vehicle performance specifications. That maximum safe speed is typically decreased for lower-friction road conditions such as gravel or dirt roads, wet roads, icy roads, or other environmental factors. Similarly, the tighter the radius of the corner, the lower the maximum safe speed. Accordingly, this may increase the level of risk predicted by the system.

The system can receive information about the driver. Sensors can monitor the state of the driver to determine whether the driver is performing at or near the maximum of their capability level. Head an eye movement sensors, vehicle motion sensors, and other sensors can determine whether a driver is fatigued or stressed, not paying attention, or otherwise not performing at their normal level of competency. Where the system determines that a driver is not performing optimally, this may also increase the level of risk predicted by the system.

At operation 508, control system evaluates the received information in view of one or more vehicle performance envelopes. This can be accomplished, for example, as described above with respect to operations 406-416 of FIG. 4. The assessment can include, for example, estimating driver intent based on human control inputs, and determining vehicle parameters based on the information received at operations 504 and 506. As a further example, given current vehicle states, actuator inputs, driver command/intent profile, speed profile, friction and so on, the system can determine whether the vehicle is being operated at or within a predetermined distance from envelope boundaries.

In various embodiments, the controller algorithm may be implemented to use MPC with envelope constraints in mind. The envelope constraints in some embodiments may be built into the control algorithm (for example, don't exceed yaw rate or steering angle). lin various embodiments, these constraints can be accounted for in the controller so that there is no need to perform threat assessment after the fact. Accordingly, various embodiments may be implemented in which no threat assessment is performed after the control algorithm.

At operation 512, the system generates an optimal solution for vehicle control to maintain operation within the determined envelope. Where the driver is controlling the vehicle within determined bounds of performance constraints, for example, the optimal solution determined by the system may be the driver input without modification. On the other hand, where the vehicle is too close to or beyond one or more performance envelopes, for each timestep in real time, the controller solves an optimization over the time horizon to find a desired input sequence. The desired input sequence may be referred herein to as an optimal command or optimal solution, even though a wholly optimal solution might not be reached depending on current circumstances and constraints.

At operation 514, the solution is applied to the subject time step. This can be accomplished, for example, as described above with respect to operation 418 of FIG. 4. In some embodiments, two approaches to applying the solution can be provided. A driver-in-loop 516 approach and a full-control approach 518.

For driver-in-the-loop scenarios, the desired input sequence may be generated to match the driver's command where no envelope violations are predicted. At the first step in the time horizon, this is assumed to be the case, and the sequence may be generated to match a driver's commands unless an envelope violation will occur at some point on the horizon. At each real timestep, the first desired command set of the time horizon is applied to the actuators, and then the process is repeated. If there are no envelope violations predicted, the driver-in-loop control result may match the driver's commands.

To stabilize the vehicle, embodiments may combine vehicle stability envelopes, actuator envelopes and vehicle models to define the minimization problem. Vehicle up-date equations (e.g., such as those based on a discretized lateral bicycle model), may provide an equality constraint, while the envelopes may provide bounded constraints or polytopic inequalities.

An example of the minimization problem is provided by a state vector in various embodiments. The state vector for the optimization in one example contains vehicle states sideslip and yaw rate, inputs of front lateral force and change in front lateral force, and a slack variable on the vehicle states, and is defined as:

$$\left[ \beta(k) \, r(k) \, \frac{F_{yf}(k)}{1000} \, \frac{\Delta F_{yf}(k)}{1000} \, S_{veh}(k) \right]^T.$$

The slack variable may be used to ensure a feasible solution. Note that any lateral force values are converted from N to kN to ensure proper scaling of the matrices.

The minimization cost function may be provided to minimize over k=1 as:

$$\begin{bmatrix} \beta(1) \\ r(1) \\ \frac{F_{yf}(1)}{1000} \\ \frac{\Delta F_{yf}(1)}{1000} \\ S_{veh}(1) \end{bmatrix}^T \begin{bmatrix} Q_\beta & & & & \\ & Q_r & & & \\ & & \frac{R_{Fyf}}{1000} & & \\ & & & \frac{R_{\Delta Fyf}}{1000} & \\ & & & & 0 \end{bmatrix} \begin{bmatrix} \beta(1) \\ r(1) \\ \frac{F_{yf}(1)}{1000} \\ \frac{\Delta F_{yf}(1)}{1000} \\ S_{veh}(1) \end{bmatrix} \cdots +$$

$$\begin{bmatrix} 0 & 0 & -1 & 0 & \sum W_{veh} \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \frac{F_{yf,driver}}{1000}$$

and over $k = 2:T$:

$$\begin{bmatrix} \beta(k) \\ r(k) \\ \frac{F_{yf}(k)}{1000} \\ \frac{\Delta F_{yf}(k)}{1000} \\ S_{veh}(k) \end{bmatrix}^T \begin{bmatrix} Q_\beta & & & & \\ & Q_r & & & \\ & & \frac{R_{Fyf}}{1000} & & \\ & & & \frac{R_{\Delta Fyf}}{1000} & \\ & & & & 0 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} \cdots +$$

$$\begin{bmatrix} 0 & 0 & -1 & 0 & \sum W_{veh} \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \frac{F_{yf,driver,pred}}{1000}$$

where Q denotes a cost on the state or input, R donates a cost on the input, and W denotes a cost on the slack variable. The first timestep in the horizon (k=1) requires minimization of the difference in the driver's command lateral force $F_{yf,driver}$ (through steering angle) and the optimal lateral force $F_{yf}(1)$, whereas subsequent steps in the horizon compare to the predicted driver's command $F_{yfdriver,pred}$.

The actuator envelopes are given by the bounded constraints:

$$\begin{bmatrix} \frac{F_{yf,min}}{1000} \\ \frac{\Delta F_{yf,min}}{1000} \\ 0 \end{bmatrix} \leq \begin{bmatrix} \frac{F_{yf}(k)}{1000} \\ \frac{\Delta F_{yf}(k)}{1000} \\ S_{veh}(k) \end{bmatrix}, k = 1:T$$

$$\begin{bmatrix} \frac{F_{yf}(k)}{1000} \\ \frac{\Delta F_{yf}(k)}{1000} \end{bmatrix} \leq \begin{bmatrix} \frac{F_{yf,max}}{1000} \\ \frac{\Delta F_{yf,max}}{1000} \end{bmatrix}, k = 1:T$$

These constraints also maintain that the slack variable is greater than zero. The minimum and maximum lateral forces are determined by the sliding force (e.g., from a lateral brush tire model) after derating, and the maximum slew rate is determined by the steering motor and the cornering stiffness.

The stability envelope (example described below) may be converted to a polytopic inequality as follows:

$$\begin{bmatrix} 1 & -\frac{b}{V_x} & 0 & 0 & -1 \\ -b_3 & 1 & 0 & 0 & -1 \\ -1 & \frac{b}{V_x} & 0 & 0 & -1 \\ b_3 & -1 & 0 & 0 & -1 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} \leq \begin{bmatrix} b_1 \\ b_4 \\ b_1 \\ b_4 \end{bmatrix}, k = 1:T$$

The 4×5 matrix is the vehicle envelope and the far right column of the 4×5 matrix denotes the slack on the vehicle envelope. The sideslip limits are provided by $b_1$ and the your rate limits are provided by $b_4$. Each line of the matrix corresponds to the max/min yaw rate or sideslip boundaries. The vehicle slack variable is taken into account here so that each boundary equation is given by:

$$H_{veh}(k)x(k) \leq G_{veh}(k)S_{veh}(k)$$

The vehicle dynamics may be constrained by the following inequality:

$$\begin{bmatrix} -1 & 0 & 0 & 0 & 0 \\ 0 & -1 & 0 & 0 & 0 \\ 0 & 0 & -1 & 1 & 0 \end{bmatrix} \begin{bmatrix} \beta(k) \\ r(k) \\ \frac{F_{yf}(k)}{1000} \\ \frac{\Delta F_{yf}(k)}{1000} \\ S_{veh}(k) \end{bmatrix} + \begin{bmatrix} A_{disc} & B_{1,disc} & 0 \\ 0 & 1 & 0 \end{bmatrix} \begin{bmatrix} \beta(k-1) \\ r(k-1) \\ \frac{F_{yf}(k-1)}{1000} \\ \frac{\Delta F_{yf}(k-1)}{1000} \\ S_{veh}(k-1) \end{bmatrix} =$$

$$-\begin{bmatrix} B_{3,disc} \\ 0 \end{bmatrix}, k = 2:T$$

$$\begin{bmatrix} 1 & 0 & 0 & 0 & 0 \\ 0 & 1 & 0 & 0 & 0 \\ 0 & 0 & 1 & -1 & 0 \end{bmatrix} \begin{bmatrix} \beta(1) \\ r(1) \\ \frac{F_{yf}(1)}{1000} \\ \frac{\Delta F_{yf}(1)}{1000} \\ S_{veh}(1) \end{bmatrix} = \begin{bmatrix} \beta_{meas} \\ r_{meas} \\ \frac{F_{yf,comm}}{1000} \end{bmatrix}, k = 1$$

These equations also require that $F_{yf}(k+1)-F_{yf}(k)=\Delta F_{yf}(k+1)$. For the initial timestep in the horizon k=1, the states are constrained to be equal to the measured states from the vehicle ($\beta$meas,Ymeas) and the most recent input ($F_{yf,comm}$). In embodiments in which the system is configured to optimize only over the lateral dynamics, $V_x$ is assumed to be known at each step of the horizon as the dynamic matrices are calculated. In various embodiments, this information may come from the trajectory optimizer.

Various vehicle parameter definitions are provided in Table 1.

TABLE 1

Vehicle Parameter Definitions

| Parameter | Units | Description |
|---|---|---|
| g | m/s$^1$ | Gravitational constant |
| P | | Coefficient of friction between tire and road |
| a | m | Distance from CG to front axle center |
| b | m | Distance from CG to rear axle center |
| L | m | Distance from front axle center to rear axle center |
| m | kg | Total vehicle mass |
| Izz | Kgm$^2$ | Yaw Inertia |
| h | m | CG height |
| $c_a$ | N/rad | Cornering stiffness |
| $c_{af}$ | kN/rad | Front axle cornering stiffness |
| Car | kN/rad | Rear axle cornering stiffness |
| p. | m | Wheel radius |

Figure 6:
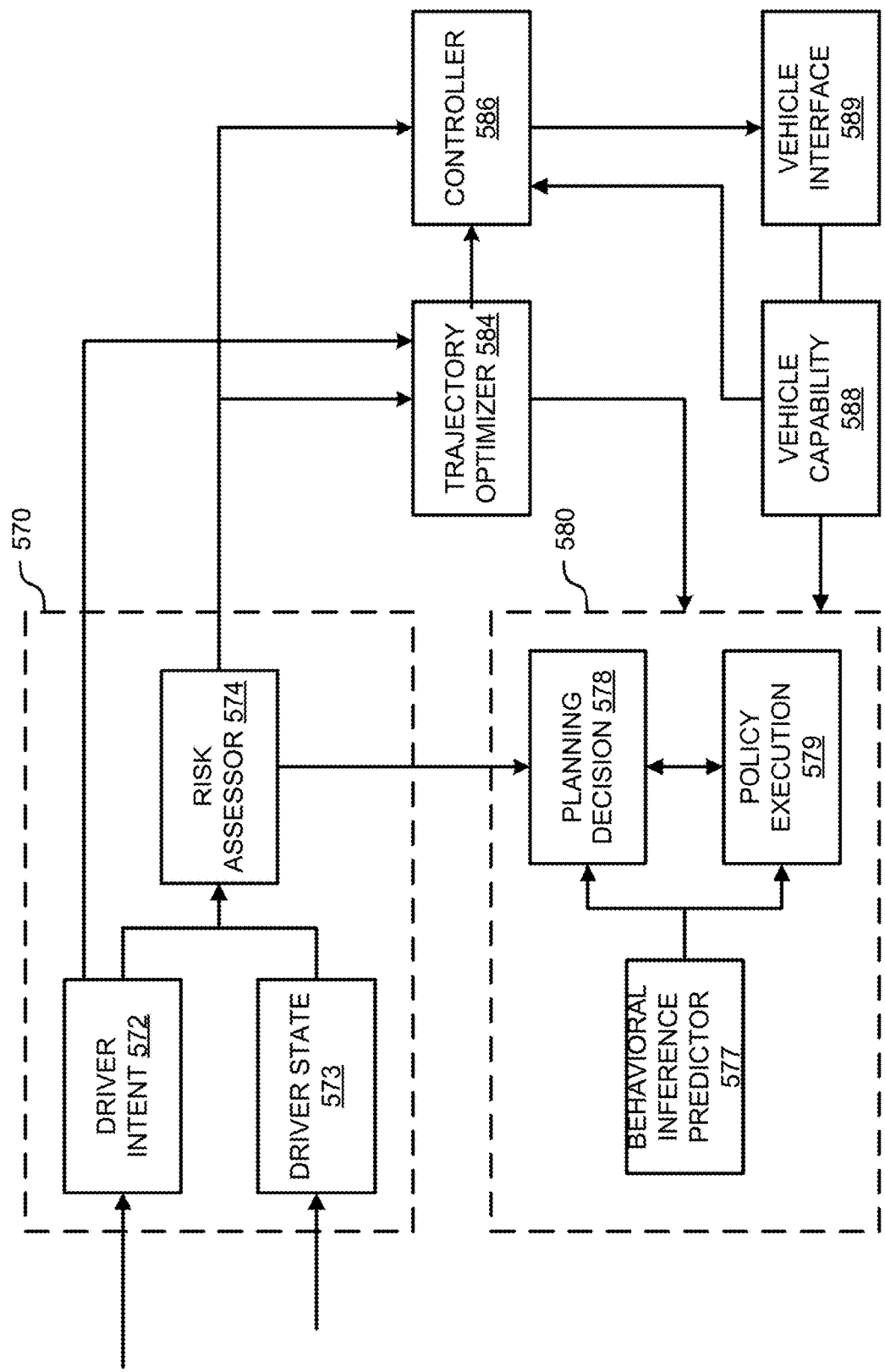
FIG. 6 illustrates an example architecture for a vehicle control mode in accordance with various implementations of the systems and methods disclosed herein.

FIG. 6 illustrates an example architecture for a vehicle control mode in accordance with various implementations of the systems and methods disclosed herein. The example illustrated in FIG. 6 includes a risk assessment subsystem 570 and a planning subsystem 580. Risk assessment subsystem 570 in this example includes a driver intent estimation module 572 and a driver state monitor 573 and a risk assessor 574. Planning subsystem 580 includes a behavioral inference prediction module 577, a planning decision module 578, and a policy execution module 579.

In operation, driver intent estimation module 572 receives information regarding human control input used to operate the vehicle. As described above, information from sensors, actuators and other systems can be used to determine the type and level of human control input. Driver intent estimation module 572 uses this information to predict driver action. As also described above, information from sensors other systems can be used to determine the state of the driver. Eye state tracking, for example, can be used to estimate driver state. This information can be provided to a risk assessment module 574 to determine the level of risk associated with vehicle operation. Although not illustrated in FIG. 6, where the assessed risk is above a determined threshold, a warning signal can be righted to a driver interface to alert the driver (e.g., audibly or visually) of the risk.

Planning subsystem 580 receives state information such as, for example from visibility maps and hazard maps and local map views. Information from a navigation system can also provide a mission plan including maps and routing to planning subsystem 580.

Behavioral interface prediction module 577 receives this information and predicts behavior characteristics within a future time horizon. This information can be provided to planning decision module 578 and policy execution module 579 which can share policy selection and policy status information with one another.

Vehicle capability assessment module 588 receives information from vehicle hardware interfaces 589 (e.g. MABX/ECU) to determine vehicle capabilities and identify a reachable set model.

Risk information from risk assessment module 574, vehicle capability information from vehicle capability assessment module 588, and applies this to trajectory information received from driver intent estimation module 572 to determine a safe or optimized trajectory for the vehicle given the drivers intent. This trajectory information can be provided to controller 586 to provide partial or full vehicle control in the event of a risk level above threshold. A signal from risk assessment module 574 can be used to trigger controller 586 to take over partial or full control of the vehicle. When control is assumed, controller 586 provides vehicle control systems to vehicle hardware interfaces 589 to control items such as, for example, steering angle, brakes, throttle, traction force, turn signals, horn, lights, etc.

Figure 7:
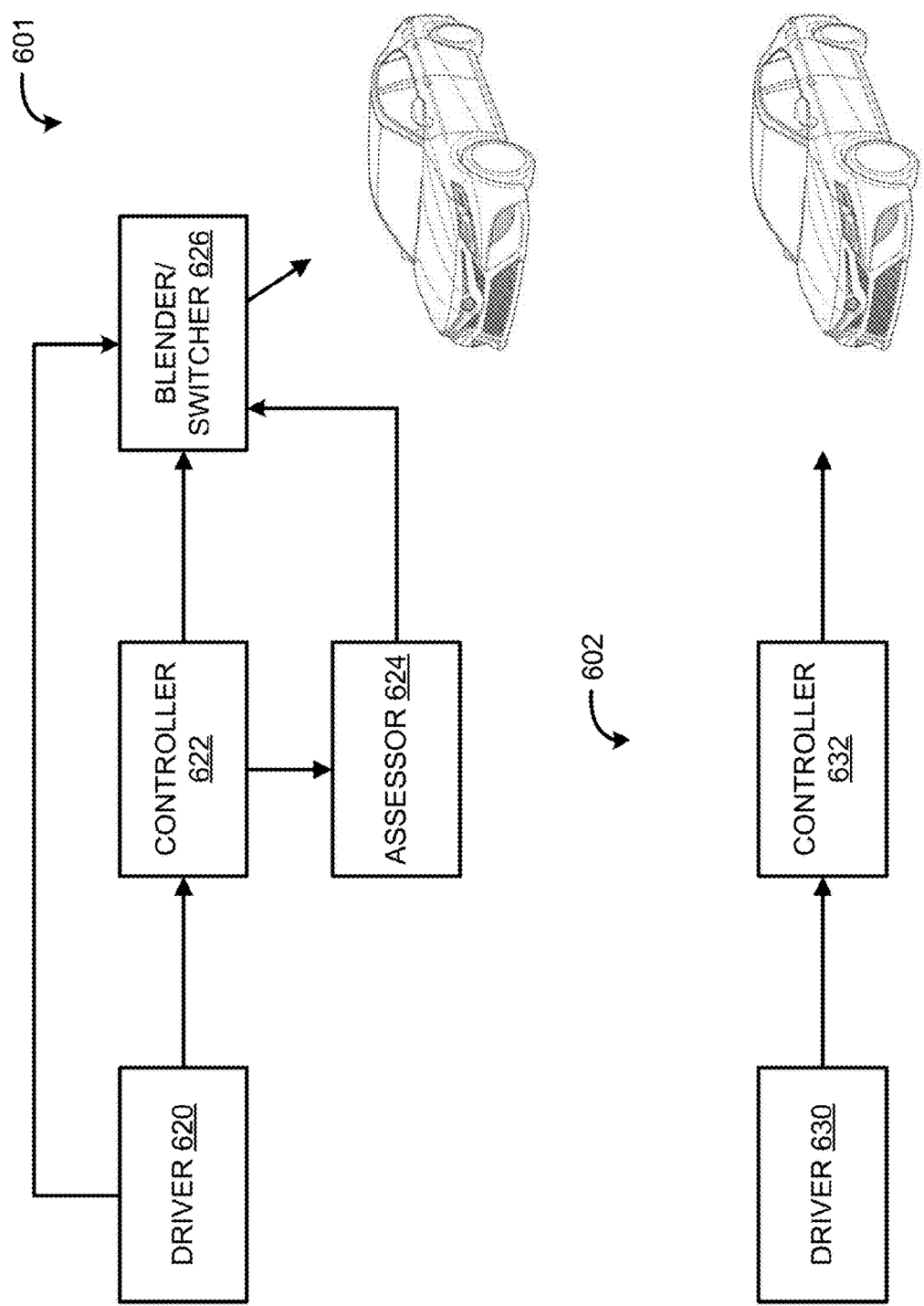
FIG. 7 illustrates example strategies for blending vehicle control in accordance with various implementations.

FIG. 7 illustrates example strategies for blending vehicle control in accordance with various implementations. The first example strategy 601 relies on a controller 622, such as a processor or other circuit, to provide a solution to blend driver input 620 with automated control to generate blended commands. Driver inputs such as driver commands for operating a vehicle are provided to the controller 622. Controller 622 determines a desired command based on the driver command in the context of operational information and/or contextual information regarding the vehicle. The desired command may be the same command made by the driver, or it may be a command that is adjusted or altered from the driver input to optimize (whether fully or partially optimized based on circumstances) the command based on the sensed operational information and/or contextual information of the vehicle.

By way of example, if the vehicle operator depresses the accelerator pedal on a slick roadway surface, the controller may adjust that command to optimize it for the slick surface (e.g., to adjust the commanded throttle input to reduce the amount of torque that might be otherwise applied to the driving wheels). Using the same example, the controller may adjust multiple commands to optimize operation of the vehicle for the slick surface. The assessor circuit 624 can determine metrics used to determine whether driver commands are used, optimized commands are used, or a combination thereof are used based on the threat level. Accordingly, the assessor circuit actuates the blender switcher to provide an actuator command to the vehicle that may encompass a range of blending of controller commands and driver commands based on the threat level.

A second example strategy 602 uses what may be referred to as implicit or optimal blending. In this example, the controller provides the desired solution and this controller-generated solution forms the commands provided to the vehicle. In some implementations of this strategy, the threats (e.g., in the form of envelope constraints) are evaluated in controller 632 so that the output of controller 632 is determined based on consideration of the envelope constraints, or threats. Controller 632 may use the envelope constraints to evaluate the viability of, or the risk posed by, driver commands. Thus, the command output from the controller already has the benefit of the threat-level considerations built into its creation.

Accordingly, unlike the first strategy 601 in which a threat assessment is made and blending is performed ex post facto based on this threat level, the second strategy 602 can be implemented without separate assessment and without the need to blend commands from two sources. Accordingly, these post-processing complexities and the costs (time and processing costs) associated therewith may be avoided. The second strategy 602 can be implemented such that the desired command output from the controller 632 is the actuator command to the vehicle. This can be implemented such that there is never a switchover needed from driver commands to desired commands as the desired commands are always utilized. Accordingly, the controller can account for the driver's intent implicitly and use desired commands for vehicle control and the controller command is already optimized (whether fully or partially optimized based on circumstances) without further threat assessment.

Implementations may be configured to amplify human control of the vehicle, rather than replace it. That is, the driver may remain in control of the car at all times, except in those cases where the system (e.g., controller 632) anticipates or identifies a pending incident and employs a corrective response in coordination with driver input. Accordingly, the system may be implemented such that the driver may continue to operate the vehicle, but in a safer manner.

Blended envelope control may be implemented within controller 632, in which the system combines and coordinates the inputs of a human operator with control from the machine. The system may be implemented, for example to accept driver input, and infer the driver's intent based on that input. The inference may be made with contextual and/or operational information as well. The intent may be translated by the control system to optimize control of the vehicle and allow it to stay within a specific safety envelope. This blended envelope control for an automobile, for example, may not only be defined by vehicle dynamics, but also by the vehicle's perception and prediction ability of all things in its immediate environment. Accordingly, in various implementations the system may be configured to take this environmental and contextual information into account, infer driver intent, predict outcomes, determine the outer limits of the safety envelope and apply optimal controls in view of the foregoing. Accordingly, the control envelope need not be a discrete on-off switch between the human control and processor-based control. Instead, various implementations can blend of both human control and processor control to achieve optimal performance. An additional implementations, the system can blend this contextual/operational aware processor control with autonomous vehicle operation in a similar fashion to achieve blended envelope control in autonomous vehicles.

In the various implementations, the optimized commands presented to the vehicle can take into account not only operational and/or contextual information regarding the vehicle, but can also consider the envelope of performance of the vehicle. In other words, the commands can be adjusted so as not to exceed the performance envelope (e.g., the performance constraints) of the vehicle. For example, consider a situation in which a vehicle is entering or about to enter a curve in the roadway. The system may be configured to determine the maximum lateral g-forces the vehicle can handle in existing conditions. Using this information and roadway information (e.g. from map or GPS information) the controller may determine how much speed the vehicle can carry into the corner without exceeding the vehicle envelope. If it appears that the vehicle is going to into the corner at too great a speed, the controller may take action to provide optimal commands to the vehicle such as reducing throttle input (e.g., remapping the throttle in real-time), reducing the amount of steering angle applied by the driver, applying braking before the corner and/or trail braking into the corner, increasing or decreasing the amount of braking as compared to that applied by the driver (e.g., to control vehicle speed or to adjust/even out the loading placed on the vehicle wheels), applying selective braking to one or more wheels to improve the cornering of the vehicle, and so on. In various implementations, the vehicle envelope information may be stored for a given vehicle and retrieved and used to develop optimal commands based on the operational and/or contextual information. In further implementations, the processor(s) may be configured to determine envelope information in real-time or near real-time based on the operational and/or contextual information. For example, the system may determine a real-time cornering envelope for a vehicle entering a corner on a wet roadway, at 75° F. with summer tires having adequate remaining tread wear. This cornering envelope in this example may include, the maximum lateral g-force the vehicle is expected to tolerate in these conditions without experiencing unwanted oversteer, understeer, or other unwanted loss of traction. Margins of safety can be built into the envelope such that the vehicle is operated safely within its outer boundaries.

In various implementations, the system can be trained using machine-learning in conjunction with actual vehicle experiences to determine optimal commands and identify the best options for safely addressing various potentially adverse situations.

In some situations, it may be impossible to track the desired path determined based on driver or planner inputs. Accordingly, embodiments can be implemented to define safe tubes to give flexibility to the controller to redefine the path or to create an optimal path. Such embodiments can be implemented to ensure stability, provide a backup plan if the plant path is not possible or to trade off ride comfort with path definition.

Figure 8:
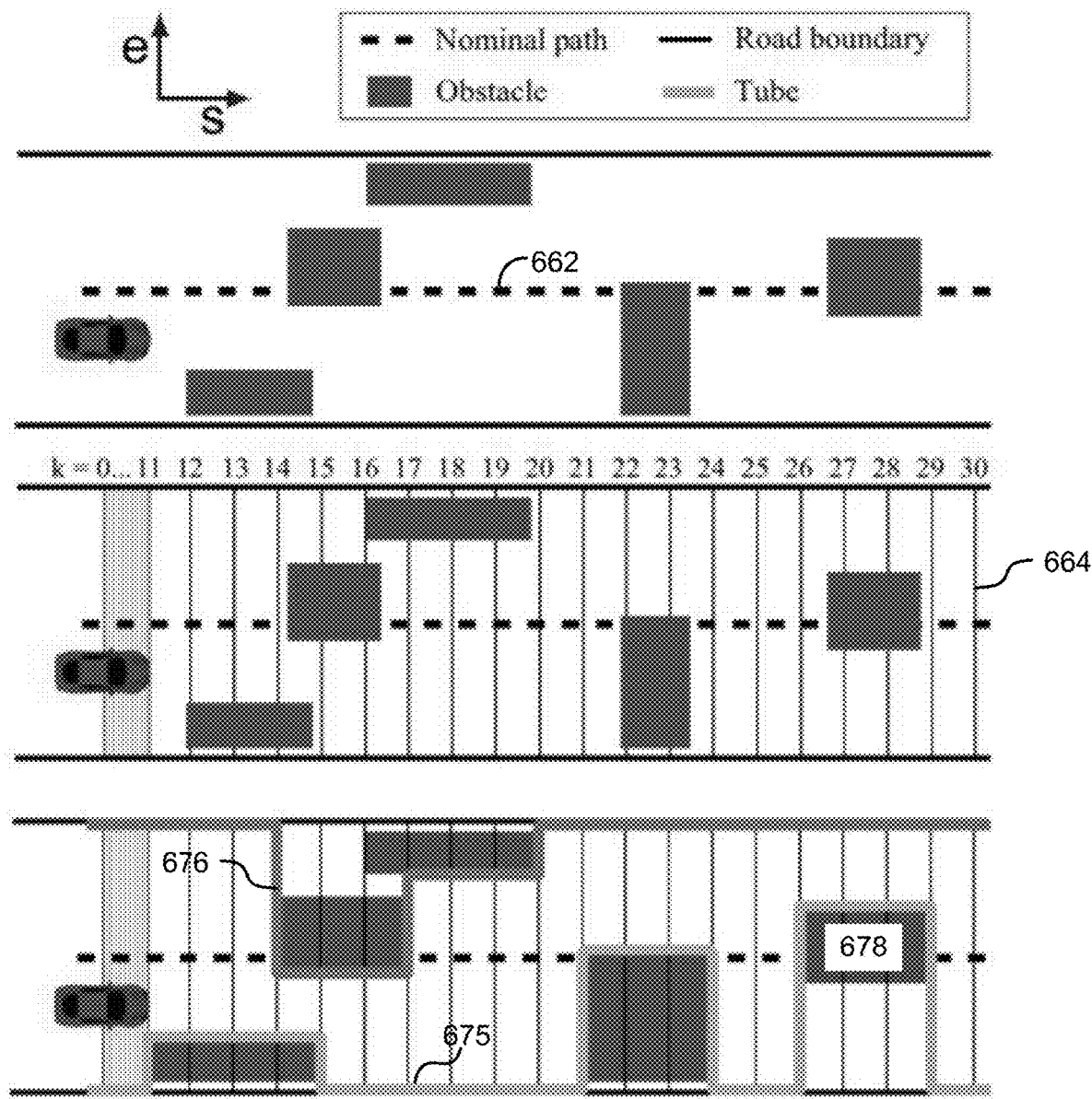
FIG. 8 illustrates an example of defining safe tubes in accordance with one embodiment.

FIG. 8 illustrates an example of defining safe tubes in accordance with one embodiment. With reference now to FIG. 8, the dashed line defines the nominal path as determined by the controller based on user input or planner input. As this example illustrates, obstacles (denoted by black boxes), whether vehicles or other obstacles) are blocking the path of the subject vehicle.

In the middle portion of the diagram 664, the problem is broken up into time segments from k=0 to k=30. Then, as shown at the bottom portion, tube boundaries 675, 676 define boundaries for possible available paths through the obstacles. The system can use this information to calculate an available path to the desired destination and various path options can be chosen based on optimum trajectory. An example of optimizing trajectory can be shown at the right hand side of the bottom segment of the figure where tube boundary 675 only defines the tube to the left-hand side of object 678 and not to the right hand side of object 678. This is a more optimum path trajectory than would be achieved by requiring vehicle to go around object 678 to the right.

Various embodiments disclosed herein utilize envelopes to determine the boundaries of vehicle performance. A safe envelope can be defined both mathematically and graphically. FIGS. 9-14 illustrate an example of the concept of envelope definition in accordance with one embodiment. Because vehicle stability characteristics are well captured by the two-state planar bicycle model with a nonlinear lateral brush tire model, the sideslip-yaw rate (β-r) phase plane provides straight-forward visualization of the vehicle dynamics. The phase plane view allows an engineer to quickly determine a safe operating region for the vehicle and design a control scheme that works hand-in-hand with the open loop dynamics.

Figure 9:
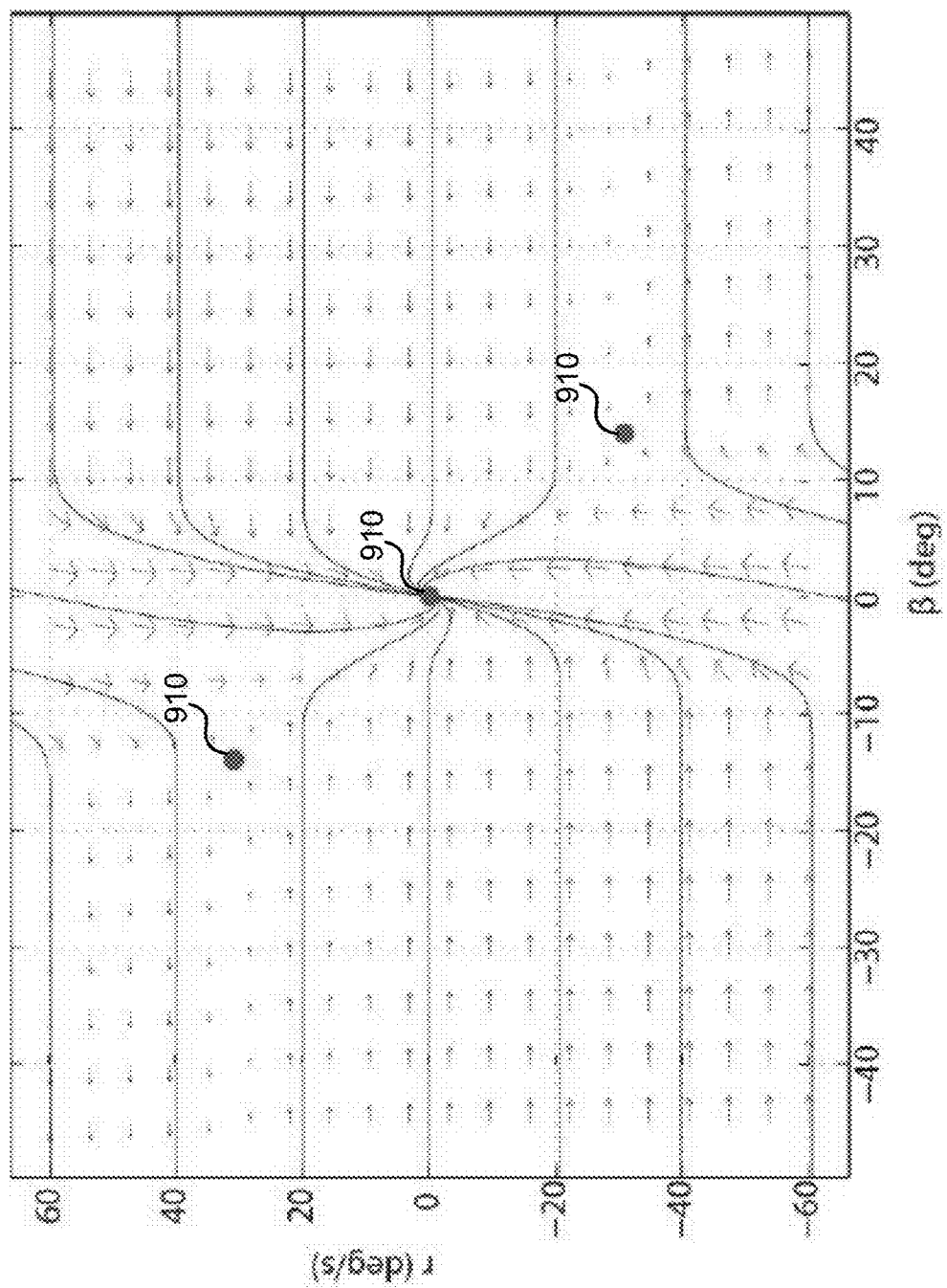
FIG. 9 illustrates an example of a phase portrait showing state trajectories and equilibrium points or a set operating point including steering angle, coefficient of friction and longitudinal speed.

FIG. 9 illustrates a phase portrait showing state trajectories and equilibrium points or a set operating point including steering angle, coefficient of friction and longitudinal speed. Equilibrium points 910 are defined where state derivatives are equal to zero. The portrait can be used to evaluate derivatives of 2 states (e.g., yaw rate, r and sideslip (β) across the state space.

Figure 10:
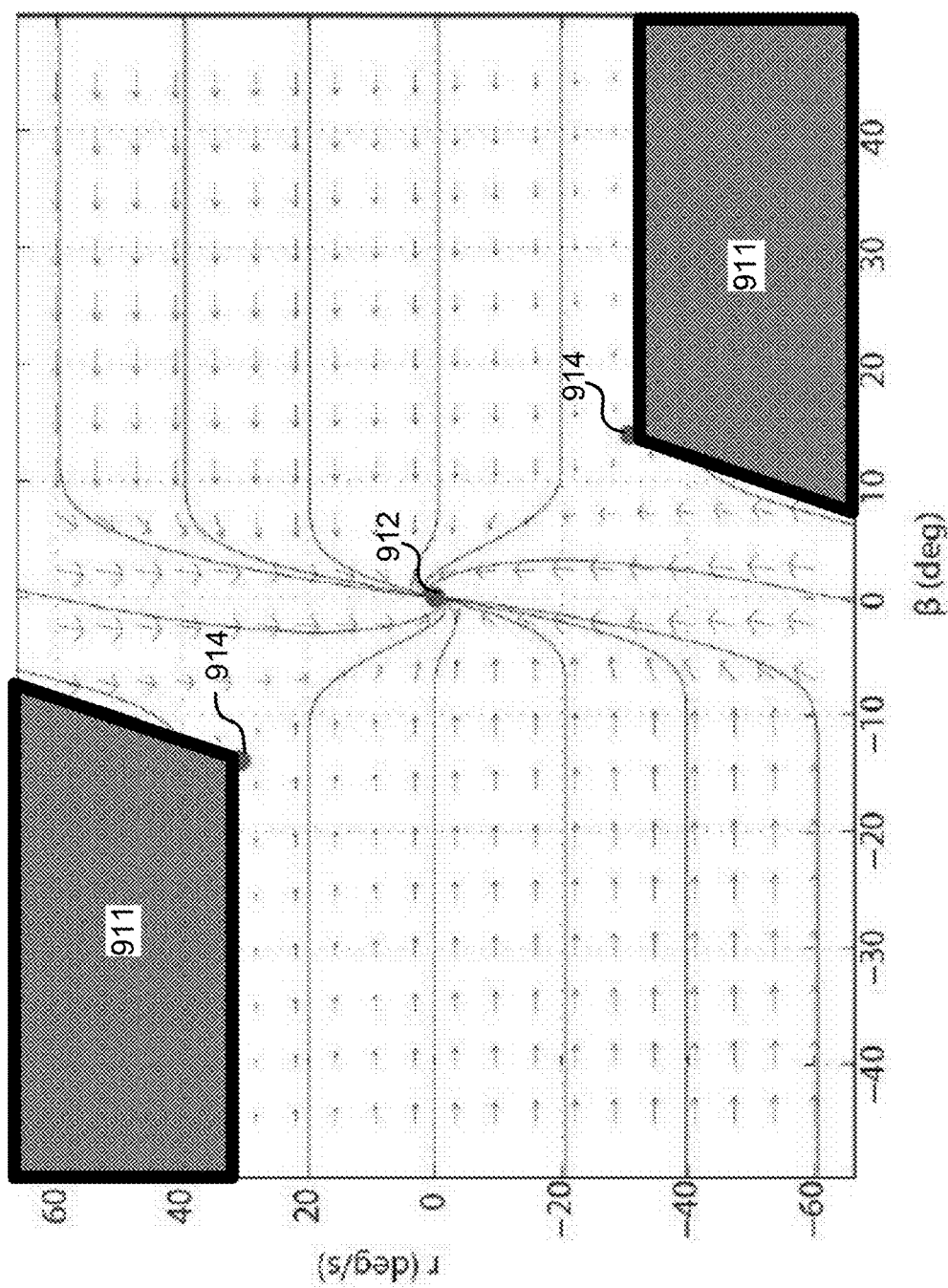
FIG. 10 illustrates an example of reaches of instability in the example illustrated in FIG. 9.

FIG. 10 illustrates reaches of instability in the example illustrated in FIG. 9. This shows regions of instability 911 for high levels of yaw rate and sideslip that can be defined based on the equilibrium points. The center equilibrium 912 illustrates a stable (focus) equilibrium. The other equilibrium points 914 define the drift (saddle) equilibria beyond which, instabilities occur.

Figure 11:
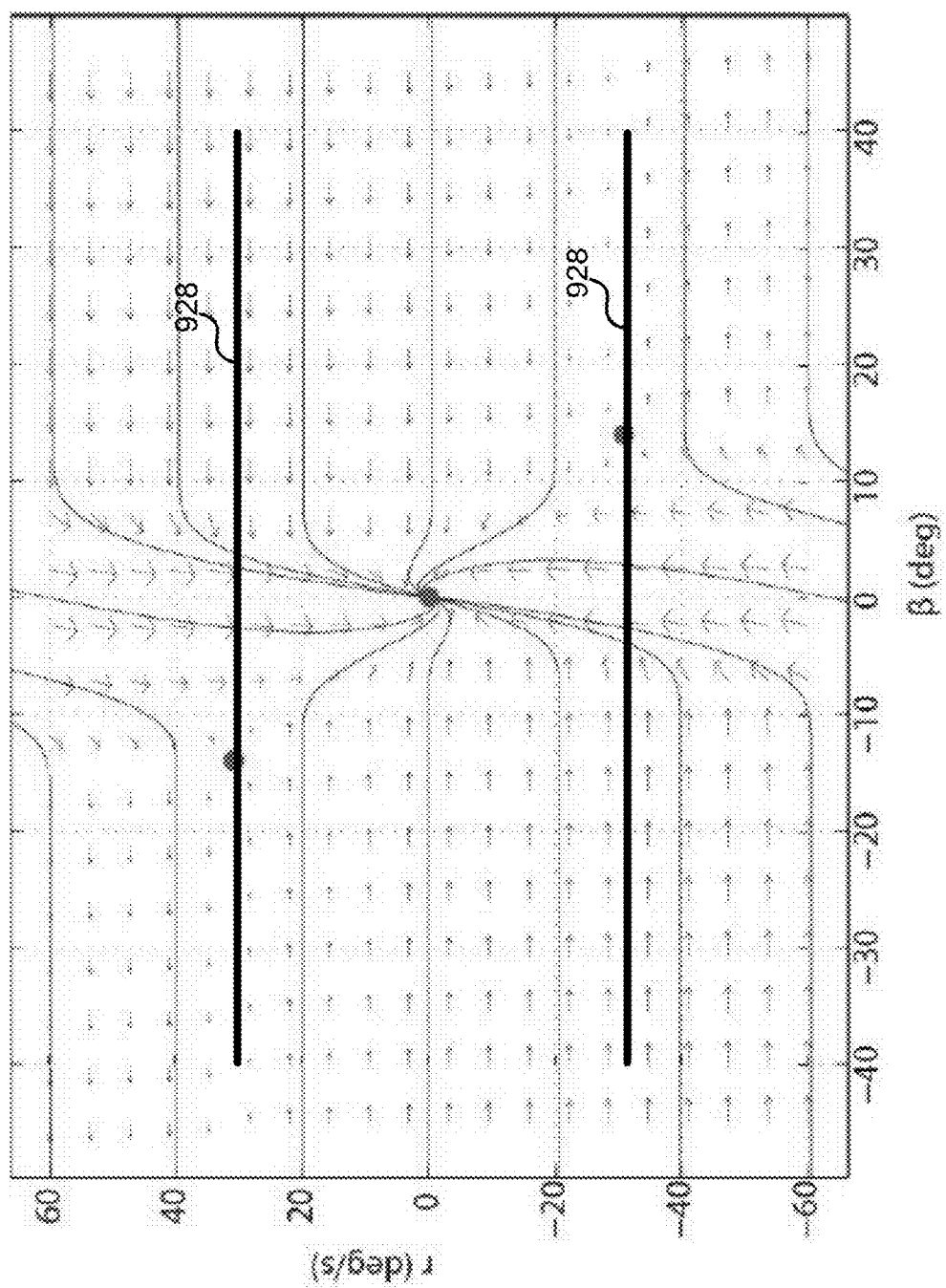
FIG. 11 illustrates that the saddle equilibria lie on the lines of maximum and minimum steady-state yaw rate, which is dependent on friction and speed.

One simple choice of boundary is a direct, constant limit on one of the states, which prevents the vehicle from entering a region of instability. For example, a yaw rate boundary at the maximum steady state yaw rate (which is constant for a given speed and friction) prevents the vehicle from increasing in yaw rate past an unstable equilibrium point. FIG. 11 illustrates that the saddle equilibria lie on the lines of maximum and minimum steady-state yaw rate 928, which is dependent on friction and speed. While these bounds keep the trajectory away from the unstable regions of the phase plane, they still allow one of the states to grow beyond the normal operating range of the vehicle. With the envelope consisting of maximum steady state yaw rate bounds, for example, the sideslip is unbounded. Any unusually large growth in sideslip angle could alarm the driver or create a dangerous situation.

Figure 12:
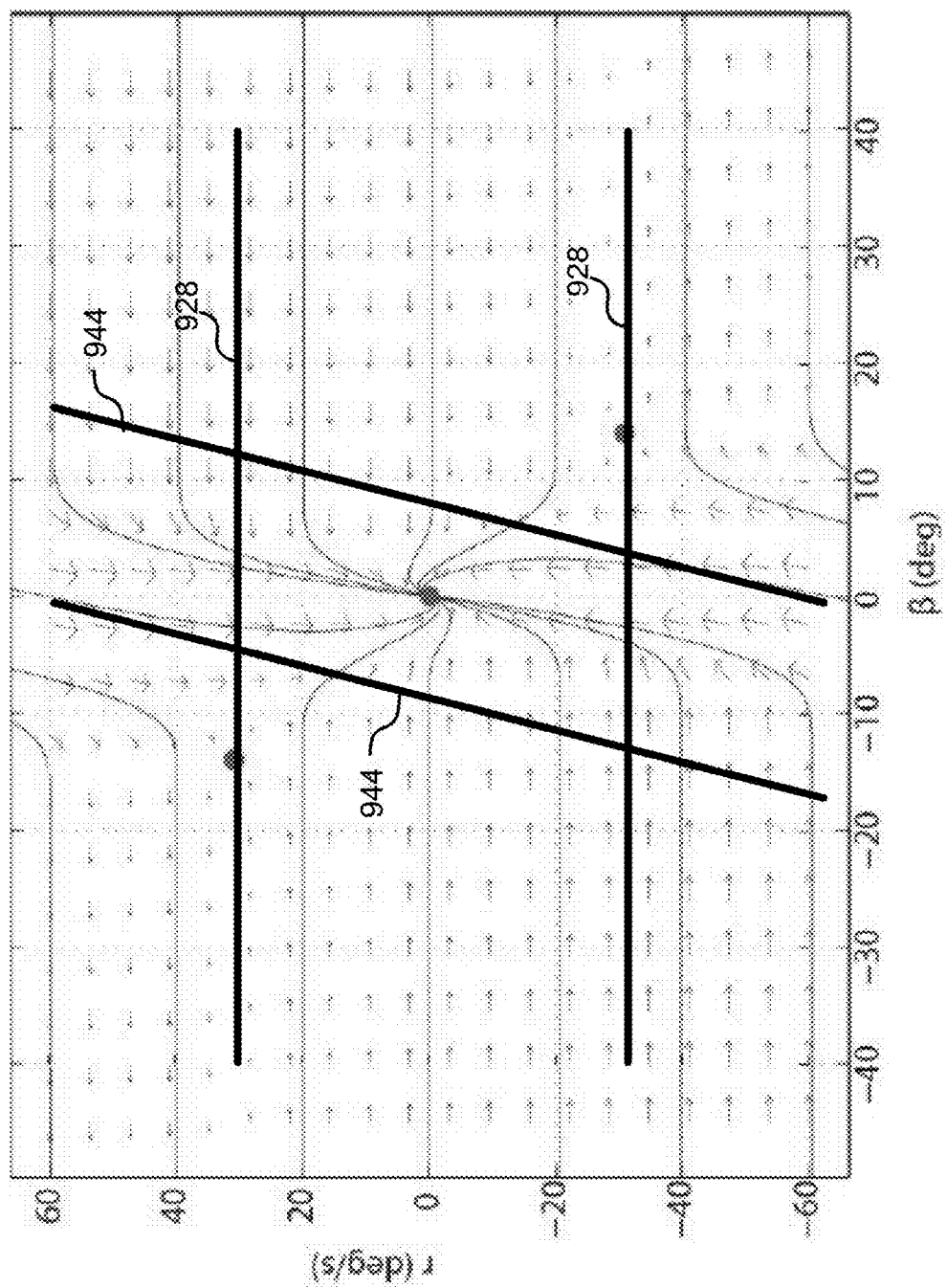
FIG. 12 illustrates an example of lines of maximum and minimum rear slip angle overlaid onto the diagram of FIG. 11.

A close boundary in a diagram prevents growth of the slip state. FIG. 12 illustrates the lines of maximum and minimum rear slip angle 944 overlaid onto the diagram of FIG. 11. The lines of maximum rear slip angle 944 determine areas of rear tire saturation. This forms a per kilogram in the state space as given by the following equations:

$$r_{max,ss} = \frac{\mu g}{V_x}$$

$$r_{min,ss} = -\frac{\mu g}{V_x}$$

$$B_{\alpha_r,max} = \frac{br}{V_x} + \tan(\alpha_{sl,r})$$

$$\beta_{\alpha_r,min} = \frac{br}{V_x} - \tan(\alpha_{sl,r})$$

Where first 2 equations identify the maximum and minimum yaw rates, and the $2^{nd}$ equation identifies the maximum and minimum slip angles. While these boundaries encompass a large region of the stable state space and normal operating range, they prevent the vehicle from reaching yaw rates above steady state, which may occur in transient maneuvers. This can result in a degradation of cornering feel, and also causes the controller to fight against the natural, stable, transient dynamics.

Figure 13:
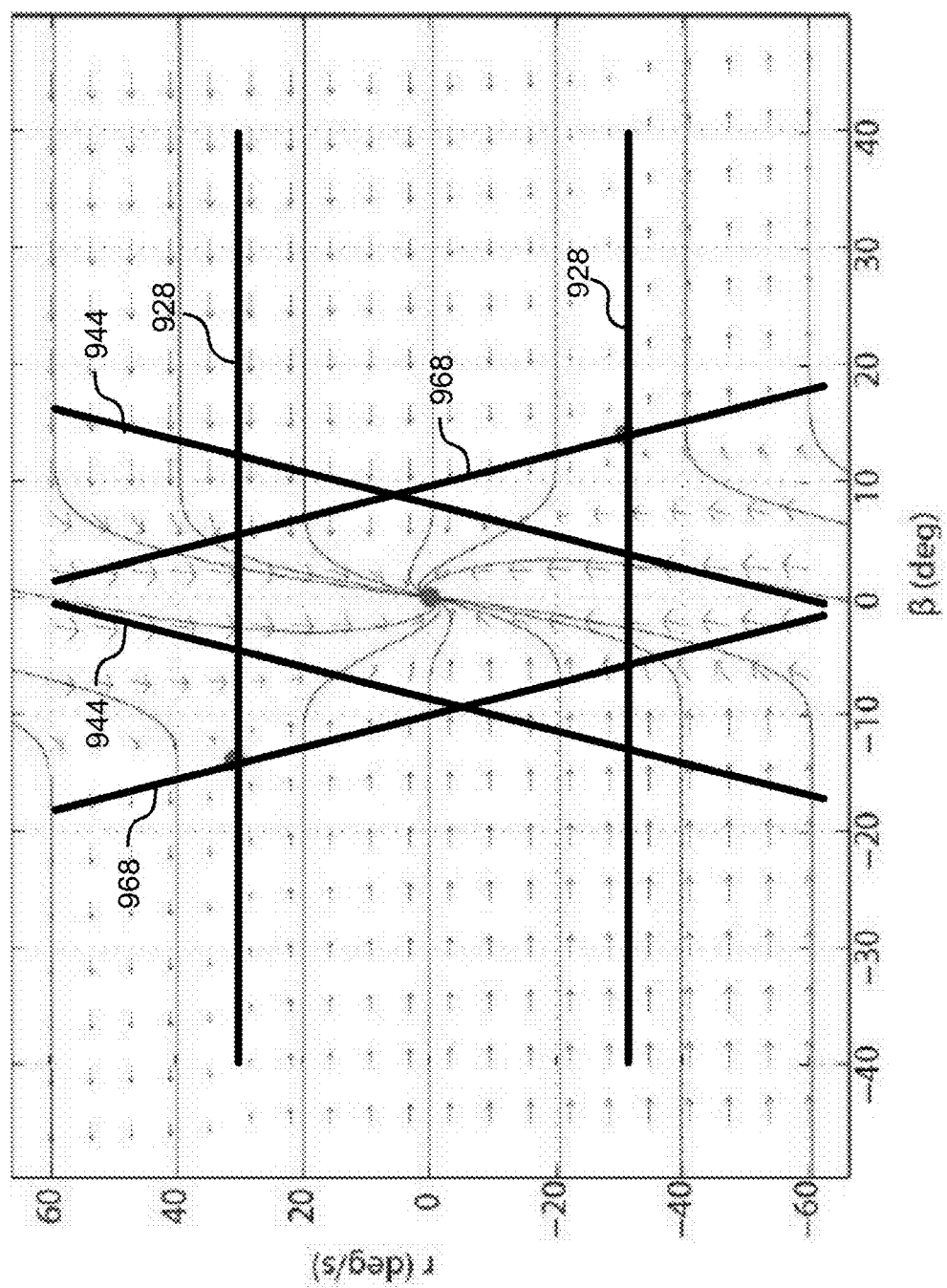
FIG. 13 illustrates an example of lines of maximum and minimum front slip angle overlaid onto the diagram of FIG. 12.
Figure 14:
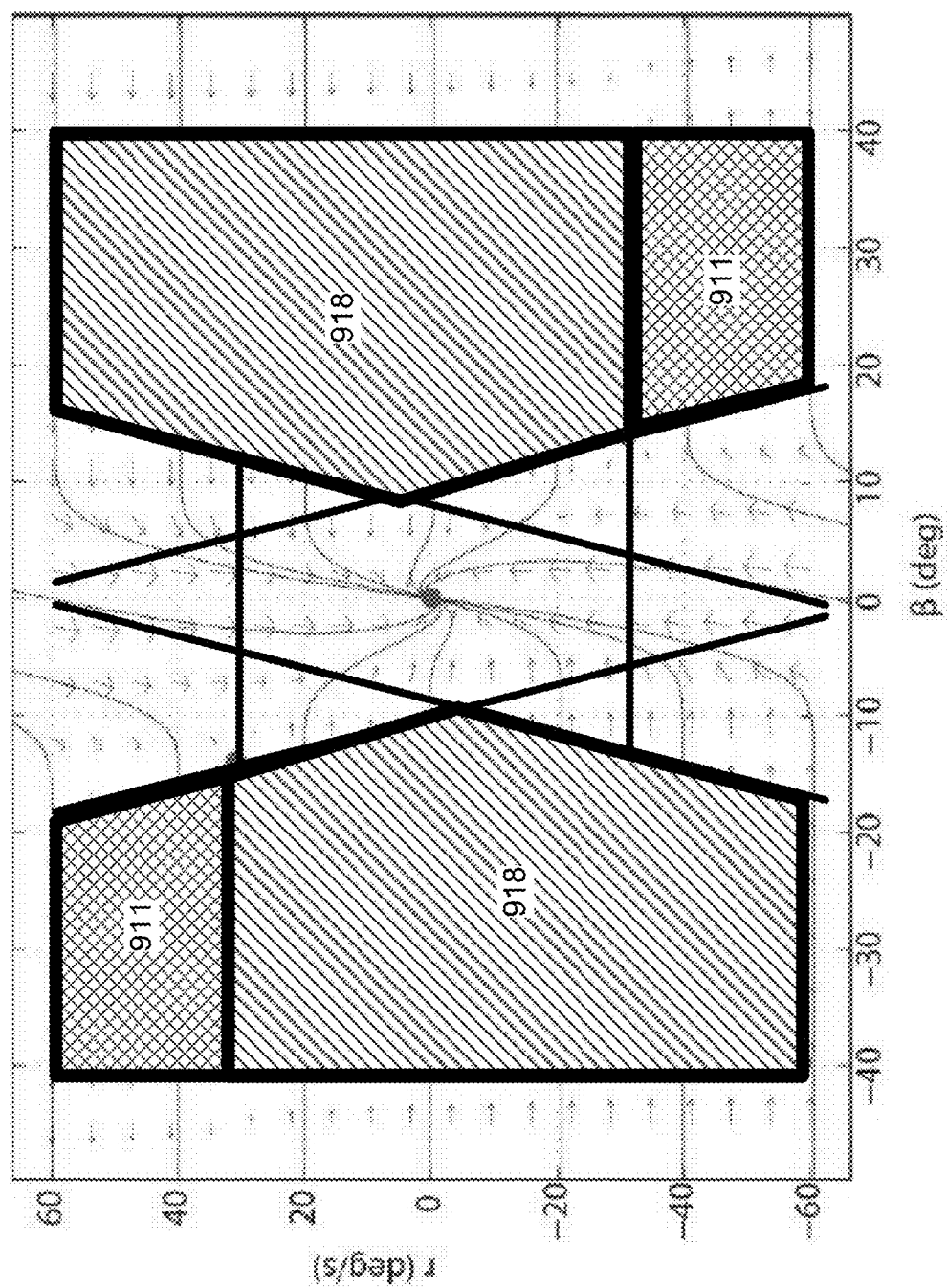
FIG. 14 illustrates an example of areas in which all tires are saturated in the example of FIG. 13.

FIG. 13 illustrates the lines of maximum and minimum front slip angle overlaid onto the diagram of FIG. 12. This illustrates that the saddle equilibria lie on the lines of maximum front slip angle 968. FIG. 14 illustrates where all tires are saturated in the example of FIG. 13. FIG. 14 shows unstable regions 911 and open loop stable regions 918.

Instead of using the maximum steady state yaw rate as a boundary, another choice is a boundary that limits yaw rate while allowing the transient overshoot dynamics. This boundary should be as consistent with the natural dynamics as possible. The maximum stable steering angle for a given speed and friction denotes the steering angle at which a bifurcation of the equilibrium points occurs and the vehicle becomes globally unstable. The line corresponding to the linearized r=0 nullcline at a steering angle of 8max encapsulates a majority of the stable open loop trajectories of the vehicle in the yaw direction of the phase plane. By choosing this nullcline as the boundary, the yaw rate is allowed to grow to its stable maximum with natural overshoot. Outside the envelope, the open loop dynamics for stable steering angles already serve to push the car back in the direction of the boundary due to the change in sign of the yaw acceleration at the nullcline. This line also follows the angle of the trajectories in the phase plane at a steering angle of 8max, which suggests that any command given by the controller along the boundary will resemble the open loop steer angle. The maximum rear slip angle limits bound the stable trajectories in the sideslip direction; however, skilled drivers may prefer a slightly wider sideslip boundary to allow drifting.

Figure 15:
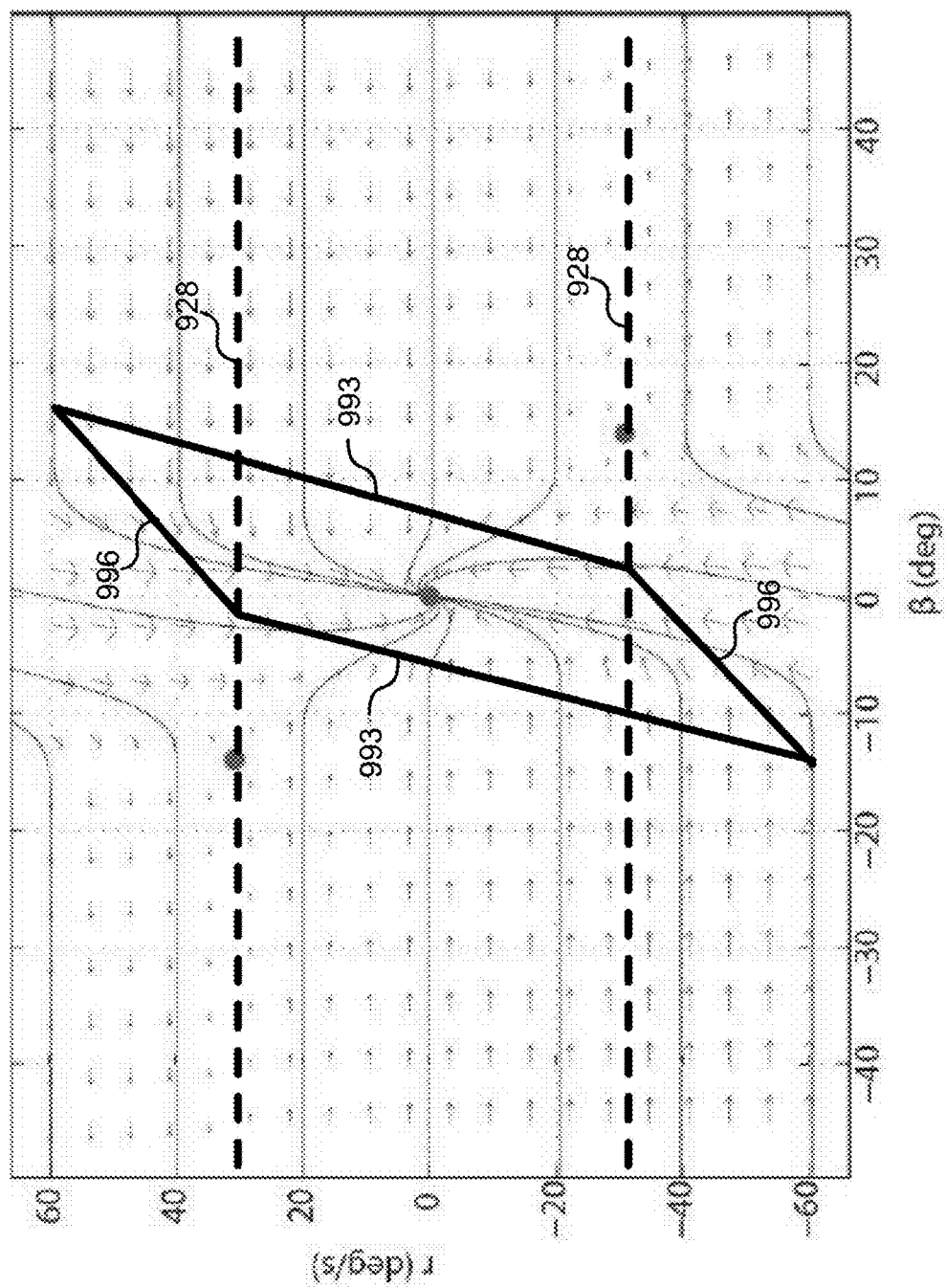
FIG. 15 illustrates an example of a nulicline envelope definition.

FIG. 15 illustrates a nullcline envelope definition. This shows the yaw acceleration nullcline 996 at the maximum steering angle. This defines the boundaries within which stability is insured and natural dynamics are respected. This boundary shape is called the Nullcline Boundary, because the yaw rate limit is defined as the linear approximation of the maximum stable yaw acceleration nullcline. The boundary does not change with steering angle if speed and friction are held constant. Segments 993 show the maximum and minimum rear slip angles to prevent sliding within the boundaries set by the yaw acceleration nullcline. This envelope can be used to identify the balance within which the vehicle is in a safe region of state space where sideslip is limited to prevent sliding and yaw rate is limited to maintain natural overshoot dynamics and steering controllability. Note that these boundaries do collapse as speed or friction goes to zero, so the boundary must be held to a non-zero quadrilateral region as this occurs; for example, by freezing the boundaries as speed or friction drops below a predetermined value.

Figure 16:
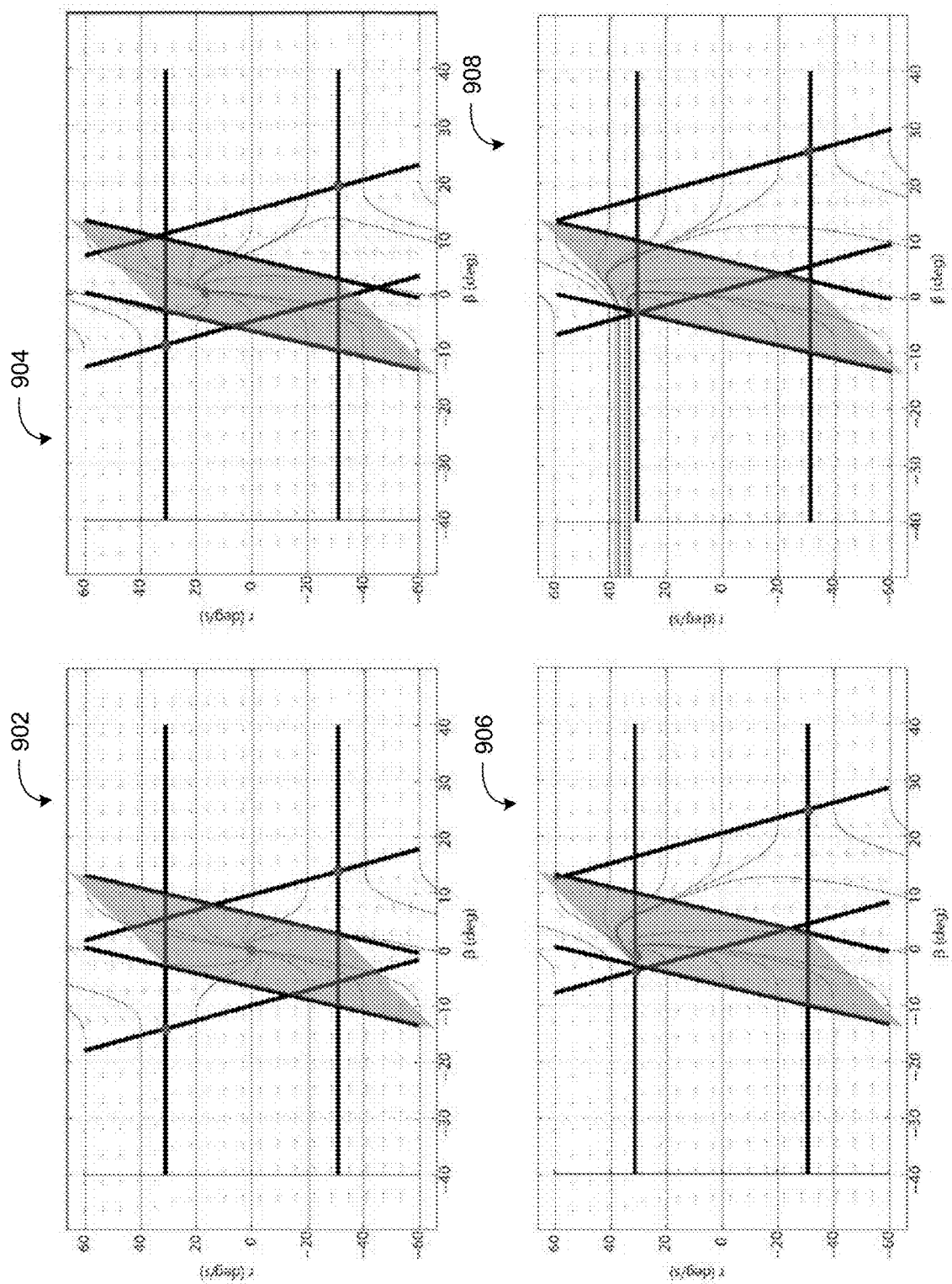
FIG. 16 illustrates an example of the stability envelope over varying steering angle dynamics.

FIG. 16 illustrates the stability envelope over varying steering angle dynamics. This example illustrates steering angle of 0° 902, 5° 904, 10° 906, and 11° 908. The yaw rate is bounded by the r nullcline at the maximum stable steering angle, while sideslip is bounded by the maximum rear slip angle. The envelope respects the natural dynamics (yaw overshoot).

In addition to performance envelopes, secondary envelopes can also be implemented to further bound the controller. For example, actuation envelopes can be used to ensure that vehicles will not receive any infeasible commands. Vehicle actuator limits can be provided to the controller so that the controller avoids commands that are beyond actuator limits. As another example, comfort envelopes can be used to guarantee that the vehicle provides a certain feel to the driver and its documents. For example, comfort envelopes can define limits on acceleration, lateral acceleration, jerk, and so on to provide a comparable ride. These envelopes may be narrower than the performance envelopes described above.

As used herein, a circuit or module might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations.

Figure 17:
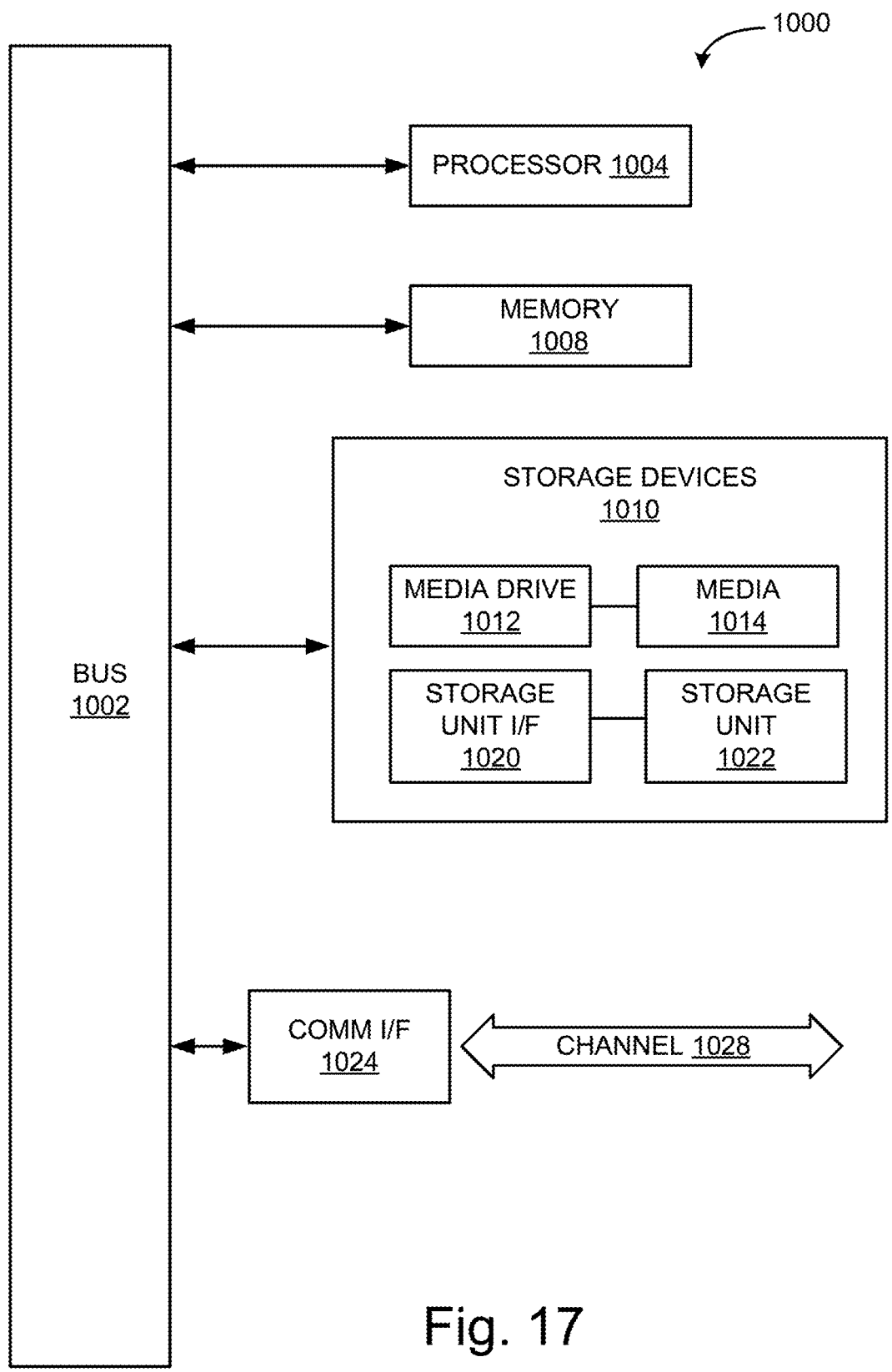
FIG. 17 illustrates an example computing system with which embodiments may be implemented.

Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 17. Various embodiments are described in terms of this example-computing system 400. After reading this description, it will become apparent to a person skilled in the relevant art how to implement the technology using other computing systems or architectures.

Referring now to FIG. 17, computing system 1000 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 1000 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1000 might include, for example, one or more processors, controllers, control modules, or other processing devices, such as a processor 1004. Processor 1004 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1004 is connected to a bus 1002, although any communication medium can be used to facilitate interaction with other components of computing system 1000 or to communicate externally.

Computing system 1000 might also include one or more memory modules, simply referred to herein as main memory 1008. For example, in some embodiments random access memory (RAM) or other dynamic memory, might be used for storing information and instructions to be executed by processor 1004. Main memory 1008 might also be used for storing temporary variables or other intermediate information during execution of instructions to be executed by processor 1004. Computing system 1000 might likewise include a read only memory ("ROM") or other static storage device coupled to bus 1002 for storing static information and instructions for processor 1004.

The computing system 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), a flash drive, or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing system 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1022 and interfaces 1020 that allow software and data to be transferred from the storage unit 1022 to computing system 1000.

Computing system 1000 might also include a communications interface 1024. Communications interface 1024 might be used to allow software and data to be transferred between computing system 1000 and external devices. Examples of communications interface 1024 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other, like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A process for vehicle control through a non-transitory computer readable medium with one or more memory modules, comprising;
    receiving first signals from a plurality of vehicle sensors and storing the first signals in the memory modules, the signals comprising operational information regarding the vehicle;
    receiving second signals comprising contextual information regarding the vehicle and storing the second signals in the memory modules;
    determining an envelope for the vehicle in a defined time horizon based on the one or more contextual restraints and at least one of vehicle parameters and driver performance data gathered and analyzed by the plurality of vehicle sensors;
    generating driver intent data to be stored in the memory modules for the defined time horizon based on the operational information, contextual information, driver performance data, and a generated risk level;
    predicting a future vehicle state based on a driver's predicted future performance and prior vehicle states;
    developing a vehicle control solution based on an analysis of the generated driver intent data and the future vehicle state to operate the vehicle within the determined envelope in the defined time horizon; and
    applying the determined control solution to the vehicle.

2. The process of claim 1, wherein determining an envelope comprises determining contextual constraints using the contextual information and defining the envelope to account for contextual constraints in addition to vehicle parameters.

3. The process of claim 2, wherein the contextual constraints shrink at least one dimension of the envelope.

4. The process of claim 3, wherein assessing a risk associated with the predicted driver intent comprises predicting a dynamic problem for the vehicle over the defined time horizon based on driver intent.

5. The process of claim 1, further comprising setting a series of discrete time steps and wherein the defined time horizon comprises a discrete time step.

6. The process of claim 5, wherein setting a series of discrete time steps comprises variable time discretization to account for short-term and long-term objectives.

7. The process of claim 1, wherein contextual constraints are used for further defining the envelope and creating a refined envelope for the vehicle, and the refined envelope is used to develop the vehicle control solution such that no threat assessment is performed after the vehicle control solution is determined.

8. The process of claim 1, wherein applying the determined control solution to the vehicle comprises generating an input sequence with an amount of modification to a driver's commands determined based on envelope proximity.

9. The process of claim 1, wherein developing a vehicle control solution comprises evaluating a vehicle envelope, and actuator envelope and vehicle models.

10. The process of claim 1, further comprising determining one or more contextual restraints.

11. The process of claim 10, wherein the contextual restraints shrink at least one dimension of the envelope.

12. A vehicle control system, comprising:
    a processor; and
    a memory coupled to the processor with one or more memory modules to store instructions, which when executed by the processor, cause the processor to
        determine an envelope for the vehicle in a defined time horizon based on the one or more contextual restraints and at least one of vehicle parameters and driver performance data gathered and analyzed by the plurality of vehicle sensors;

generate driver intent data to be stored in the memory modules for the defined time horizon based on operational information, contextual information about the vehicle, driver performance data, and a generated risk level;

predicting a future vehicle state based on a driver's predicted future performance and prior vehicle states;

develop a vehicle control solution based on an analysis of the generated driver intent data and the future vehicle state to operate the vehicle within the determined envelope in the defined time horizon; and apply the determined control solution to the vehicle.

13. The system of claim 12, wherein determining an envelope comprises determining contextual constraints using the contextual information and defining the envelope to account for contextual constraints in addition to vehicle parameters.

14. The system of claim 13, wherein the contextual constraints shrink at least one dimension of the envelope.

15. The system of claim 14, wherein assessing a risk associated with the predicted driver intent comprises predicting a dynamic problem for the vehicle over the defined time horizon based on driver intent.

16. The system of claim 12, wherein the memory stores instructions, which when executed by the processor, cause the processor to: set a series of discrete time steps and the defined time horizon comprises a discrete time step.

17. The system of claim 16, wherein dividing the operation into a series of discrete time steps comprises variable time discretization to account for short-term and long-term objectives.

18. The system of claim 12, wherein contextual constraints are used to further define the envelope and create a refined envelope for the vehicle, and the refined envelope is used to develop the vehicle control solution such that no threat assessment is performed after the vehicle control solution is determined.

19. The system of claim 12, wherein applying the determined control solution to the vehicle comprises generating an input sequence with an amount of modification to a driver's commands determined based on envelope proximity.

20. The system of claim 12, wherein developing a vehicle control solution comprises evaluating a vehicle envelope, and actuator envelope and vehicle models.

* * * * *